United States Patent
Ha et al.

(10) Patent No.: US 12,371,189 B2
(45) Date of Patent: Jul. 29, 2025

(54) METHOD FOR MULTIMODAL TRANSPORTATION BASED ON AIR VEHICLE AND APPARATUS FOR THE SAME

(71) Applicants: HYUNDAI MOTOR COMPANY, Seoul (KR); KIA CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 418 days.

(21) Appl. No.: 17/728,117

(22) Filed: Apr. 25, 2022

(65) Prior Publication Data

US 2023/0002083 A1 Jan. 5, 2023

(30) Foreign Application Priority Data

Jul. 1, 2021 (KR) .................. 10-2021-0086650

(51) Int. Cl.
- *B64F 1/36* (2024.01)
- *B64U 101/64* (2023.01)
- *G05D 105/28* (2024.01)
- *G06Q 10/083* (2024.01)
- *G06Q 50/40* (2024.01)
- *G08G 5/21* (2025.01)

(52) U.S. Cl.
CPC .......... *B64F 1/368* (2013.01); *G06Q 10/083* (2013.01); *G06Q 50/40* (2024.01); *G08G 5/21* (2025.01); *B64U 2101/64* (2023.01); *G05D 2105/28* (2024.01)

(58) Field of Classification Search
None
See application file for complete search history.

(56) References Cited

U.S. PATENT DOCUMENTS

| | | | |
|---|---|---|---|
| 9,523,986 B1* | 12/2016 | Abebe | G06Q 10/083 |
| 2016/0026186 A1* | 1/2016 | Kazama | B65G 1/137 |
| | | | 701/24 |
| 2018/0060813 A1* | 3/2018 | Ford | H04W 4/44 |
| 2018/0137454 A1* | 5/2018 | Kulkarni | G05D 1/021 |
| 2019/0072979 A1* | 3/2019 | Sukhomlinov | G06Q 50/40 |

FOREIGN PATENT DOCUMENTS

| | | |
|---|---|---|
| JP | 5982729 B2 | 8/2016 |
| KR | 101884232 B1 | 8/2018 |
| KR | 10-1917194 B1 | 11/2018 |
| KR | 20190126756 A | 11/2019 |
| KR | 2020-0075330 A | 6/2020 |

* cited by examiner

*Primary Examiner* — Christian Chace
*Assistant Examiner* — Shayne M. Gilbertson
(74) *Attorney, Agent, or Firm* — MCDONNELL BOEHNEN HULBERT & BERGHOFF LLP

(57) ABSTRACT

A method for multimodal transportation based on an air vehicle may include confirming, by a transportation management server, freight transfer approval information provided by a freight transfer object that approaches a take-off and landing facility, setting a freight stop zone in response to a demand for freight handling of the freight transfer object, and processing freight loading or unloading of the freight transfer object based on freight information corresponding to the freight transfer object.

16 Claims, 18 Drawing Sheets

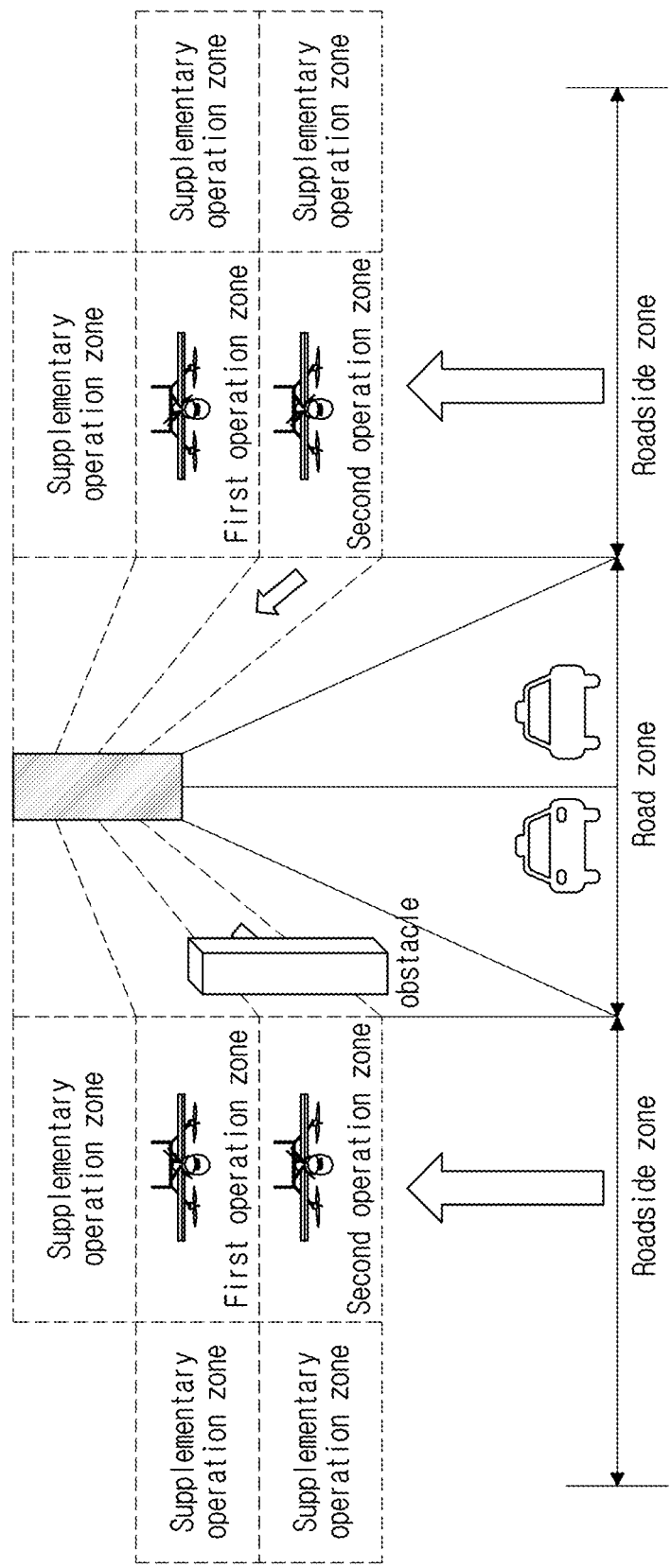

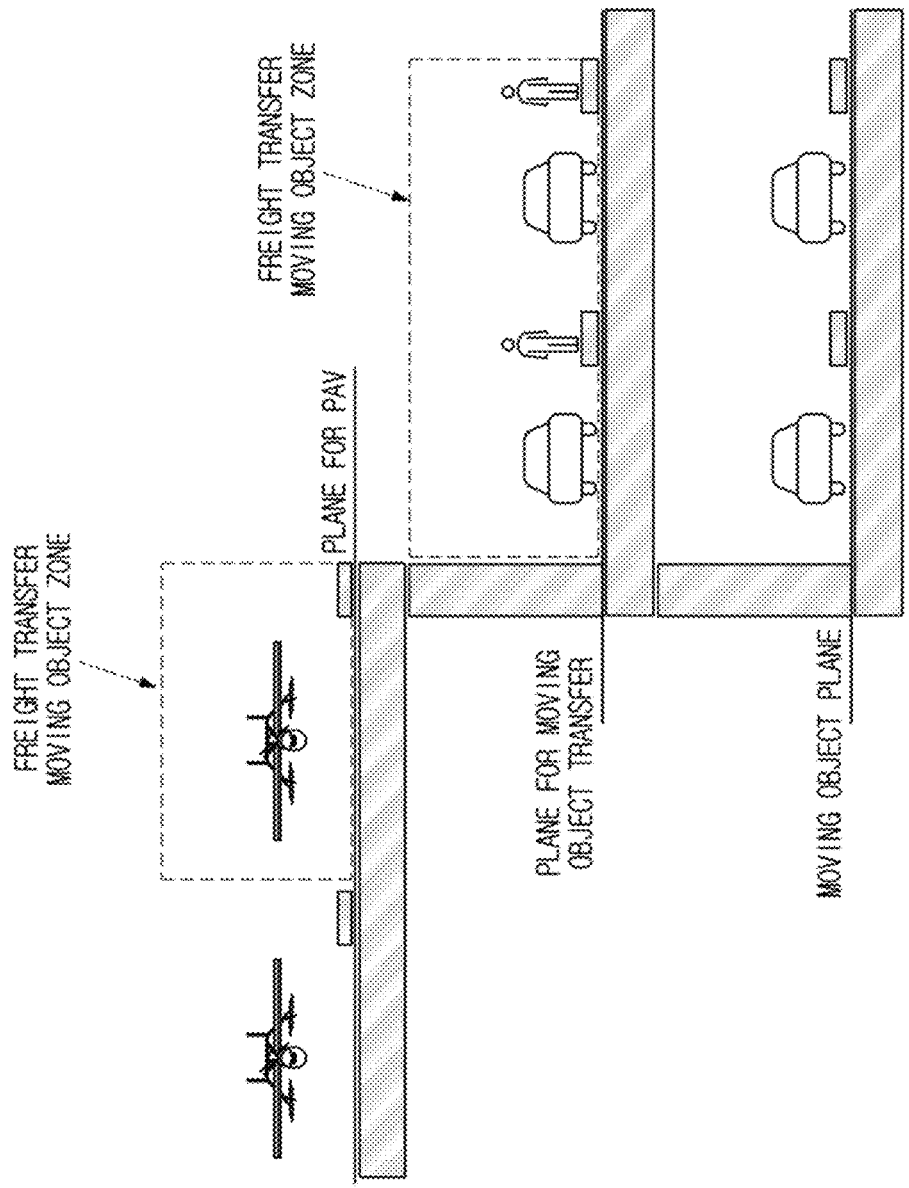

METHOD FOR MULTIMODAL TRANSPORTATION BASED ON AIR VEHICLE AND APPARATUS FOR THE SAME

CROSS REFERENCE TO RELATED APPLICATIONS

The present application claims priority to Korean patent application 10-2021-0086650, filed Jul. 1, 2021, the entire contents of which are incorporated herein for all purposes by this reference.

BACKGROUND

Field

The present disclosure relates to a method and apparatus for multimodal transportation using an air vehicle, and particularly to a method and apparatus for controlling freight transfer between different transportation objects.

Description of the Related Art

Next-generation air mobility devices such as an urban air mobility (UAM) and a personal air vehicle (PAV) have been devised to overcome the limitations of the existing means of transportation running on the ground and to travel in the three-dimensional space. Unlike the traditional means of aviation transport including the existing aircrafts and helicopters, those next-generation air mobilities are being developed to take off and land in various types of space without separate large facility dedicated to take-off and landing.

SUMMARY

Although next-generation air mobility devices do not require a large separate facility dedicated to take-off and landing, if many air vehicles are distributed, the air vehicles are supposed to operate in a prearranged altitude zone under air control. Furthermore, although an air vehicle does not require a large separate facility dedicated to take-off and landing, a basic facility, which enables an air vehicle to take off and land, may be needed to control smoothly the movement or operation of the air vehicle.

The present disclosure may provide a structure of a multimodal transportation system that is capable of effectively realizing freight transportation by using a multimodal transportation object in an environment of a take-off and landing facility, which is required for the operation of an air vehicle.

Also, the present disclosure may provide a method and apparatus for controlling effectively transfer of freight by utilizing a structure of a multimodal transportation system that is provided in a take-off and landing facility.

According to an embodiment of the present disclosure, a method for multimodal transportation based on an air vehicle may be provided. The method may include confirming, by a transportation management server, freight transfer approval information provided by a freight transfer object that approaches a take-off and landing facility, setting a freight stop zone in response to a demand for freight handling of the freight transfer object, and processing freight loading or unloading of the freight transfer object based on freight information corresponding to the freight transfer object.

The method for multimodal transportation based on an air vehicle may include presetting, by the transportation management server, the freight transfer approval information.

The setting of the freight transfer approval information may include providing freight information on at least one piece of transferred freight, determining at least one piece of freight that is to be transferred by the freight transfer object, and generating the freight transfer approval information corresponding to the at least one piece of freight that is determined.

The freight transfer approval information may include at least one among an identifier of the selected freight, an identifier of an object that will transfer the freight, information on a departure point of transfer, information on a destination of transfer, a departure time of transfer and an arrival time of transfer.

The confirming of the freight transfer approval information may include receiving a message, which includes the freight transfer approval information, from the freight transfer object.

The message including the freight transfer approval information may include a message which is transmitted from an air vehicle and requests entry into the take-off and landing facility.

The message including the freight transfer approval information may include a message which is transmitted from a moving object and notifies entry into the take-off and landing facility.

The freight transfer object may include at least one of a freight transfer air vehicle and a freight transfer moving object.

The freight stop zone may include at least one of a freight air vehicle stop zone, in which the freight transfer air vehicle stops, and a freight moving object stop zone, in which the freight transfer moving object stops.

The processing of the freight loading or unloading of the freight transfer object may include controlling a transfer apparatus provided in the take-off and landing facility so that the freight is loaded on or unloaded from the freight transfer object.

The processing of the freight loading or unloading of the freight transfer object may include controlling loading on or unloading from the freight transfer object through communication between the freight transfer object and the transportation management server.

The method for multimodal transportation based on an air vehicle may further include setting a general stop zone, as freight handling of the freight transfer object is not demanded.

The freight stop zone may include at least one of a freight transfer air vehicle stop zone and a freight transfer moving object stop zone.

The general stop zone may include at least one of a general air vehicle stop zone and a general moving object stop zone.

In the take-off and landing facility, the freight transfer air vehicle stop zone and the freight transfer moving object stop zone may be prepared on a same plane and be distinguished by different areas.

In the take-off and landing facility, the freight transfer air vehicle stop zone and the freight transfer moving object stop zone may be prepared on different planes.

In the take-off and landing facility, the general air vehicle stop zone and the general moving object stop zone may be prepared on a same plane and be distinguished by different areas.

In the take-off and landing facility, the general air vehicle stop zone and the general moving object stop zone may be prepared on different planes.

The freight stop zone may be prepared on a different plane from the general stop zone.

The freight stop zone may include at least one of a freight transfer air vehicle stop zone and a freight transfer moving object stop zone, and the general stop zone may include at least one of a general air vehicle stop zone and a general moving object stop zone. The freight transfer air vehicle stop zone and the general air vehicle stop zone may be prepared on a same plane and be distinguished by different areas, and the freight transfer moving object stop zone and the general moving object stop zone may be prepared on a same plane and be distinguished by different areas.

According to another embodiment of the present disclosure, a multimodal transportation system for processing multimodal transportation may be provided. The system may include a first freight transfer object, a second freight transfer object, a freight transfer apparatus that is provided in a take-off and landing facility and processes freight process between the first freight transfer object and the second freight transfer object, and a transportation management server that confirms freight transfer approval information from the first freight transfer object, sets a stop zone, in which the first freight transfer object may stop, and controls freight loading or unloading of the first or second freight transfer object.

According to another embodiment of the present disclosure, a multimodal transportation facility apparatus for supporting freight transfer among a plurality of freight transfer objects may be provided. The multimodal transportation facility apparatus may include a freight transfer air vehicle stop zone, in which at least one freight transfer air vehicle stops, a freight transfer moving object stop zone, in which at least one freight transfer moving object stops, a take-off and landing pad where the at least one freight transfer air vehicle takes off and lands, a freight transfer apparatus for processing freight transfer between the at least one freight transfer moving object and the at least one freight transfer air vehicle, and a transportation management server for controlling at least one operation among the freight transfer moving object, the freight transfer air vehicle and the freight transfer apparatus.

A multimodal transportation facility may include at least one of a general air vehicle stop zone and a general moving object stop zone.

The freight transfer air vehicle stop zone and the freight transfer moving object stop zone may be prepared on a same plane and be distinguished by different areas.

The freight transfer air vehicle stop zone and the freight transfer moving object stop zone may be provided on different planes.

The general air vehicle stop zone and the general moving object stop zone may be prepared on a same plane and be distinguished by different areas.

The general air vehicle stop zone and the general moving object stop zone may be provided on different planes.

The transportation management server may set a stop zone, in which the at least one freight transfer moving object or the at least one freight transfer air vehicle may stop, and include a local transportation management server that controls the freight transfer apparatus.

The transportation management server may allocate transfer of the freight and include a central transportation management server that stores and manages freight information on the freight.

According to another embodiment of the present disclosure, a local transportation management server apparatus in a multimodal transportation system may be provided. The local transportation management server apparatus may include a communication unit capable of communicating with at least one freight transfer object and a central transportation management server, which are provided in a multimodal transportation system, at least one storage medium, and at least one processor. The at least one process may be configured to control entry of the at least one freight transfer object, to check freight information on freight that is loaded on or unloaded from the at least one freight transfer object, and to control freight transfer between the at least one freight transfer object.

The at least one processor may be configured to check whether or not the freight air vehicle needs to handle freight in the multimodal transportation facility and also check the condition of the freight air vehicle stop zone.

The at least one processor may be configured to determine a stop, in which the freight transfer air vehicle may stop, based on the condition of the freight air vehicle stop zone.

The at least one processor may be configured to check freight information corresponding to the freight transfer air vehicle through a central transportation management server and to control, based on the freight information, freight loading or unloading between the at least one freight transfer object.

The at least one processor may be configured to control freight loading or unloading between the at least one freight transfer object by controlling the freight transfer apparatus.

According to another embodiment of the present disclosure, a central transportation management server apparatus in a multimodal transportation system may be provided. The apparatus may include a communication unit capable of communicating with at least one freight transfer object and a local transportation management server, which are provided in a multimodal transportation system, at least one storage medium, and at least one processor.

The at least one processor may be configured to manage information on the at least one freight transfer object, to manage freight information and to allocate freight that is to be transferred through the at least one freight transfer object.

The at least one processor may be configured to provide the freight information to a user and to allocate freight, which is selected by the user, to the least one freight transfer object corresponding to the user.

The central transportation management server may configure freight transfer approval information, which corresponds to the allocated freight, and provide the freight transfer approval information to the at least one freight transfer object.

The present disclosure may provide a multimodal transportation system that is capable of effectively realizing freight transportation by using a multimodal transportation object in an environment of a determine take-off and landing facility, which is required for the operation of an air vehicle.

Also, the present disclosure may provide a method and apparatus for controlling effectively transfer of freight by utilizing a structure of a multimodal transportation system that is provided in a take-off and landing facility.

BRIEF DESCRIPTION OF THE FIGURES

FIGS. 1A, 1B, and 1C are views illustrating operation zones for an air vehicle used in an air vehicle control system according to an embodiment of the present disclosure.

FIGS. 4A, 4B, and 4C illustrate a structure of a take-off and landing facility in a multimodal transportation system according to an embodiment of the present disclosure.

DETAILED DESCRIPTION

Figure 1A:
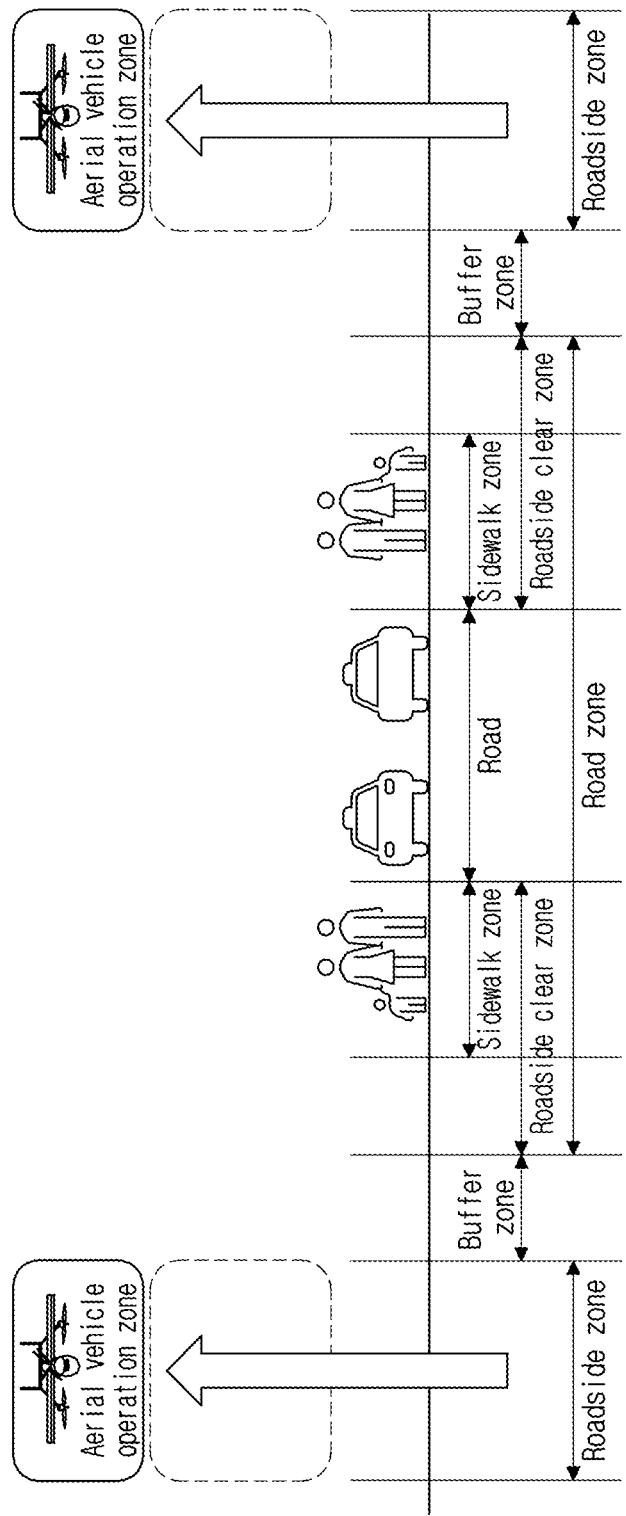

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various exemplary embodiments are not necessarily essential components, and some may be optional components. Accordingly, exemplary embodiments consisting of a subset of the components described in one embodiment are also included within the scope of the present disclosure. Also, exemplary embodiments that include other components in addition to the components described in the various embodiments are also included in the scope of the present disclosure.

Advantages and features of the present disclosure, and methods for achieving them will be apparent with reference to the exemplary embodiments described below in detail with reference to the accompanying drawings. However, the present disclosure is not limited to the exemplary embodiments set forth herein but may be embodied in many different forms. The present exemplary embodiments are provided to make disclosed contents of the present disclosure thorough and complete and to completely convey the scope of the disclosure to those with ordinary skill in the art.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

An aerial vehicle control system according to an embodiment of the present disclosure may include a system for controlling next-generation aerial mobilities such as urban air mobility (UAM) and personal air vehicle (PAV). When a configuration or operation of an aerial vehicle control system is described according to an embodiment of the present disclosure, a personal aerial vehicle is used, but the present disclosure does not limit next-generation aerial mobilities to personal aerial vehicles, and various next-generation mobilities may be used.

Figure 1B:
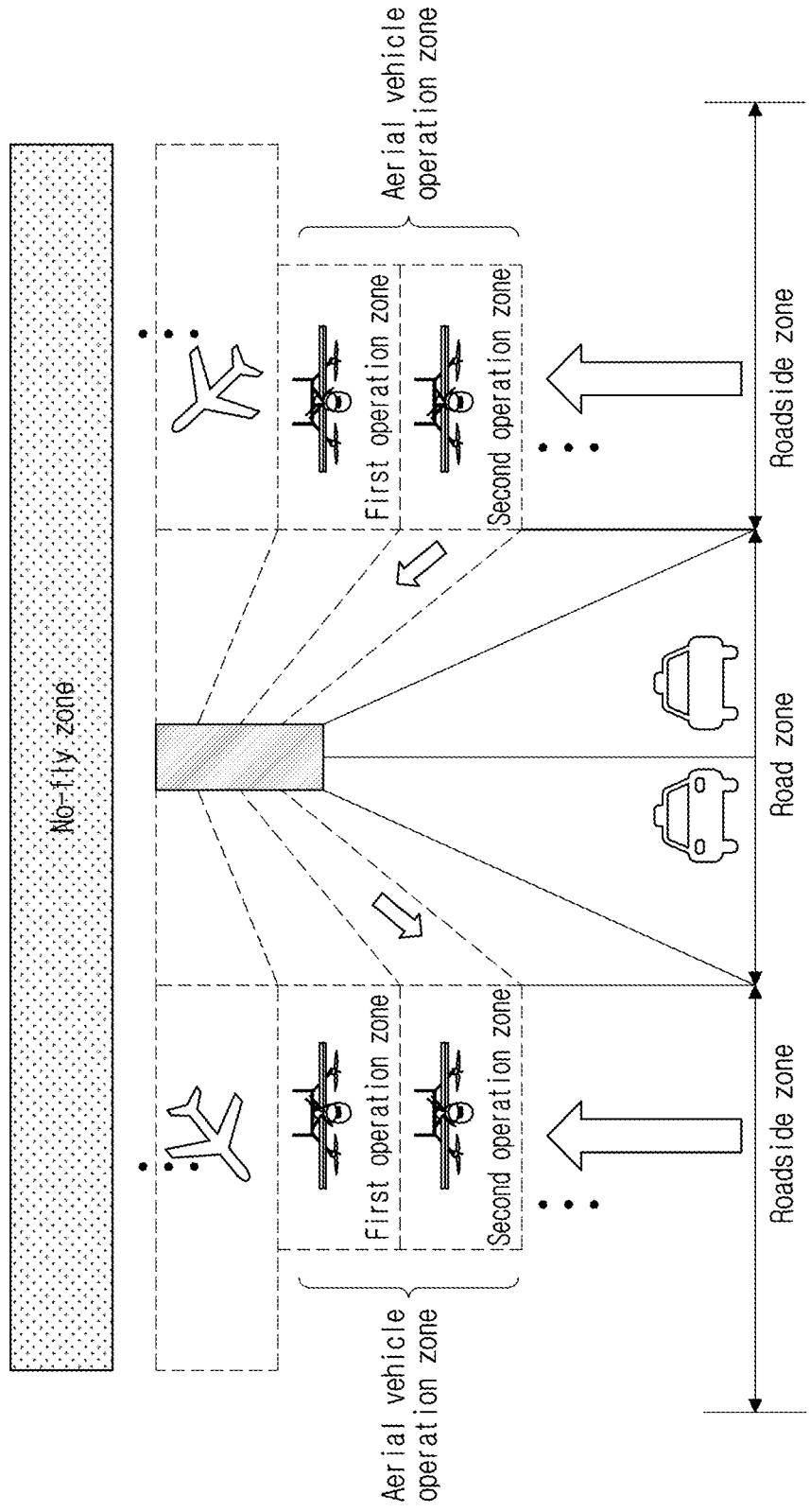

FIGS. 1A to 1C are views illustrating operation zones for an aerial vehicle used in an aerial vehicle control system according to an embodiment of the present disclosure.

In an embodiment of the present disclosure, an aerial vehicle control system may control movement of an aerial vehicle, particularly to enable the aerial vehicle to move in an aerial vehicle operation zone.

First, referring to FIG. 1A, an aerial vehicle operation zone may be set based on a road zone in which a moving object is operated. Herein, the road zone may be a zone on the ground in which a road is set. Herein, the road may include a driveway, in which a moving object is moved, and a sidewalk zone in which people move. As another example, a road zone may include a road zone and a roadside clear zone, which are set according to a road act.

As an example, an aerial vehicle operation zone may be set as a zone at a predetermined height or higher above a road zone. Furthermore, in case a personal aerial vehicle has an abnormality and lands or crashes while operating in an aerial vehicle operation zone set above a road zone, a moving object (or a person) moving in the road zone may be affected. Accordingly, it is desirable that an aerial vehicle operation zone is set vertically above a neighboring zone of a road zone (hereinafter, referred to as "roadside zone"), instead of vertically above the road zone. For example, it is desirable that a preset distance range from a road zone is set as a roadside zone and an aerial vehicle operation zone is set above the roadside zone. Furthermore, a predetermined buffer zone may be set between the road zone and the roadside zone.

Referring to FIG. 1B, an aerial vehicle operation zone may include a multiplicity of operation zones that are distinguished in vertical direction. For example, an aerial vehicle operation zone may include a first operation zone and a second operation zone, and the first operation zone may be managed as a higher course than the second operation zone. In addition, a first operation zone may be set and managed as a relatively higher zone than a second operation zone. Accordingly, an aerial vehicle control system may control an aerial vehicle moving at relatively high speed to move in the first operation zone and control an aerial vehicle moving at relatively low speed to move in the second operation zone. As another example, an aerial vehicle control system may manage a second operation zone as a slow land and a first operation zone as a fast lane.

As yet another example, a type of an aerial vehicle may be set according to size or purpose of use, and a type of an aerial vehicle capable of operating in a multiplicity of operation zones may be set and managed. As an example, according to purpose of use, aerial vehicles may be classified into passenger aerial vehicles and cargo aerial vehicles. Accordingly, an aerial vehicle control system may control a passenger aerial vehicle to move in the first operation zone and control a cargo aerial vehicle to move in the second operation zone. As another example, according to size, aerial vehicles may be classified into small aerial vehicles, mid-sized aerial vehicles and large aerial vehicles. Correspondingly, an aerial vehicle control system may control an aerial vehicle with relatively large size to operate in a higher course. As an example, an aerial vehicle control system may control a large aerial vehicle to move in the first operation zone and control a small aerial vehicle or a mid-sized aerial vehicle to move in the second operation zone. As yet another example, an aerial vehicle operation zone may include a first operation zone, a second operation zone and a third operation zone, and an aerial vehicle control system may control a large aerial vehicle to move in the first operation zone, a mid-sized aerial vehicle to move in the second operation zone and a small aerial vehicle to move in the third operation zone.

In an embodiment of the present disclosure, a first operation zone, a second operation zone and a third operation zone are illustrated as multiple operation zones, but the present disclosure is not limited thereto, and the number of operation zones may vary.

Referring to FIG. 1C, in an embodiment of the present disclosure, an aerial vehicle operation zone may include a supplementary operation zone capable of expanding an operation zone either vertically or horizontally. For example, there may be an obstacle at a certain point or in a section of an aerial vehicle operation zone, a supplementary operation zone may be set to drive by evading the obstacle. As an example, a supplementary operation zone may be configured by expanding an operation zone in vertical direction. As another example, one of 8 directions from an operation path of an aerial vehicle may be set as a supplementary operation zone.

Furthermore, a supplementary operation zone may be configured adaptively according to a type of an obstacle. For example, in case there is a fixed obstacle, an aerial vehicle control system may set a supplementary operation zone in a corresponding section so that an aerial vehicle operation zone may be managed by being temporarily expanded. As another example, in case a movable obstacle is identified, an aerial vehicle control system may identify a movement direction and speed of the movable obstacle and set a supplementary operation zone by selecting one of 8 directions from an operation course of an aerial vehicle as an optimal evasion zone.

As an example, an aerial vehicle operation zone may be set based on a predetermined altitude. As another example, an aerial vehicle operation zone may change its altitude adaptively according to weather information. For example, weather information may include information for identifying weather conditions like snowfall, rainfall, fog and the like, and an altitude range of an aerial vehicle operation zone may be set based on such weather information. An altitude range of an aerial vehicle operation zone may be set in predetermined distance units (e.g., 300 m, 500 m, and 1 km).

Figure 2A:
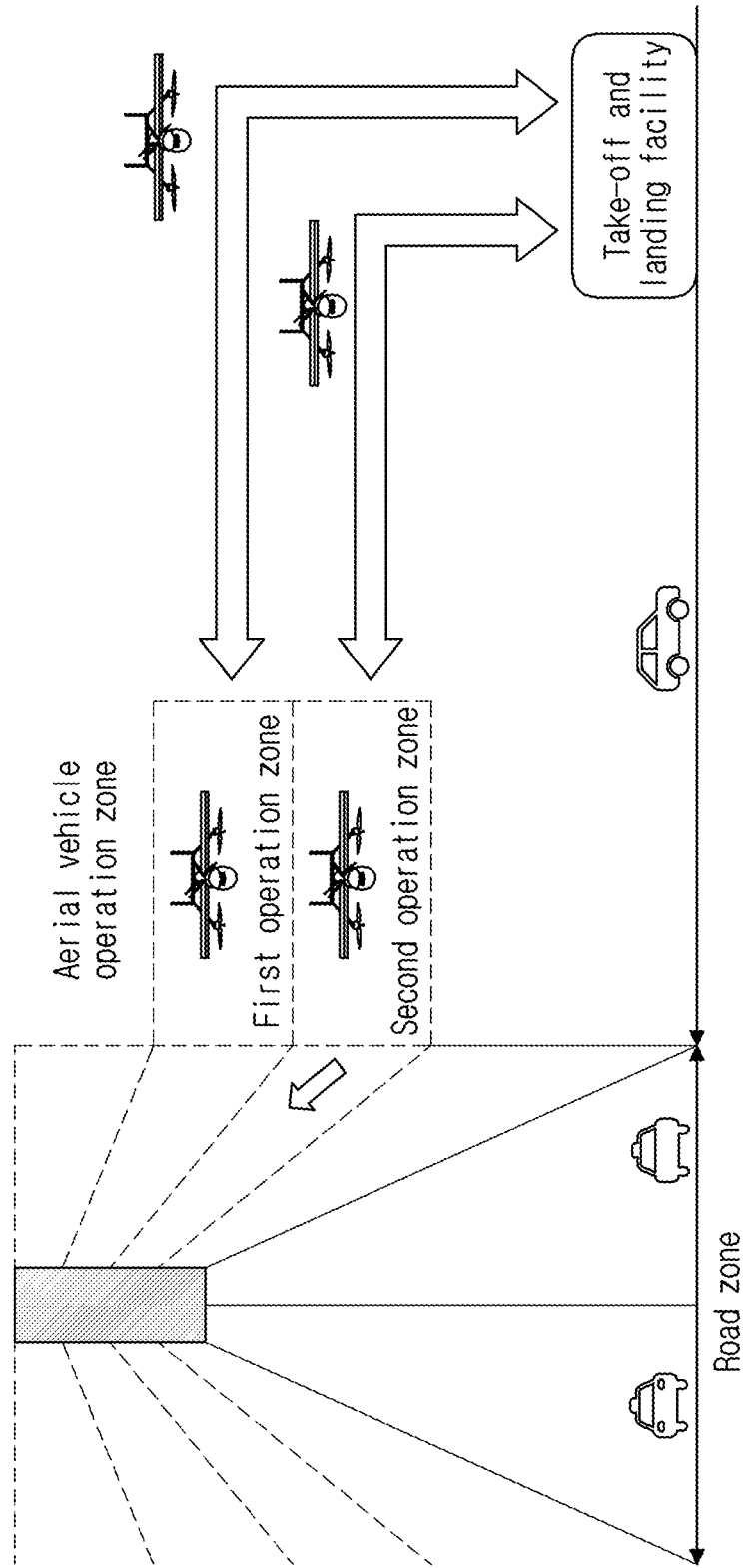
FIG. 2A is a view illustrating the structure of a take-off and landing facility and an aerial vehicle operation zone, which are prepared in an air vehicle control system, according to an embodiment of the present disclosure.

Meanwhile, referring to FIG. 2A, an aerial vehicle may enter an aerial vehicle operation zone restrictedly through a take-off and landing facility. Herein, the take-off and landing facility may include a space, in which an aerial vehicle may take off or land, and a controller capable of controlling entry into and exit from an aerial vehicle operation zone. As an example, the take-off and landing facility may include an expressway tollgate facility, a service facility and the like. Furthermore, it is desirable that the take-off and landing facility is installed at one side or both sides of a road zone.

Figure 2B:
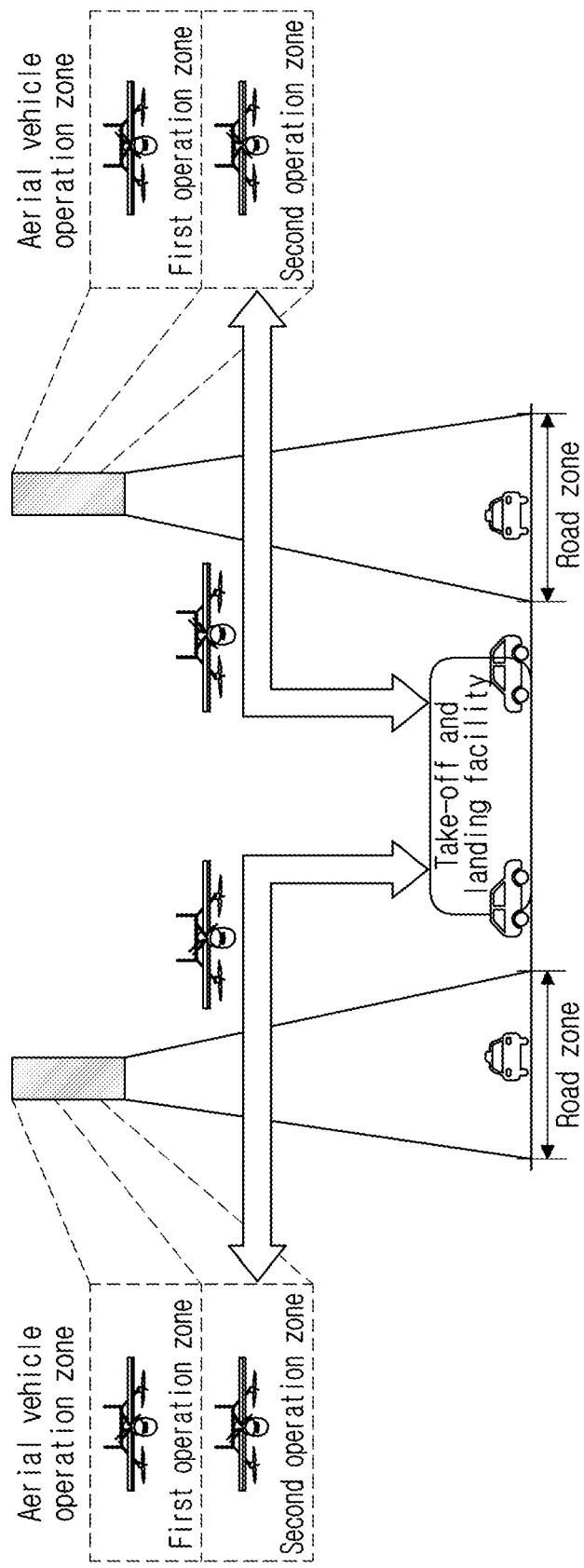
FIG. 2B is another view illustrating the structure of a take-off and landing facility and an air vehicle operation zone, which are prepared in an aerial vehicle control system, according to an embodiment of the present disclosure.

As another example, referring to FIG. 2B, a road zone may have a northbound lane and a southbound lane separate from each other, and an expressway tollgate facility, a service facility and the like may be installed in the central areas of the northbound lane and the southbound lane respectively. Thus, a take-off and landing facility may be located in the central area of a road zone.

Furthermore, a take-off and landing facility may be connected with a control server that performs control of take-off and landing of an aerial vehicle, control of entry into and exit from an aerial vehicle operation zone, and information exchange with an aerial vehicle. A control server may include a local control server and a central control server. A local control server may include a server that is provided within a take-off and landing facility or adjacent to the take-off and landing facility. In addition, a central control server may include a server that is connected with at least one local control server and performs overall control of an aerial vehicle control system.

Figure 3A:
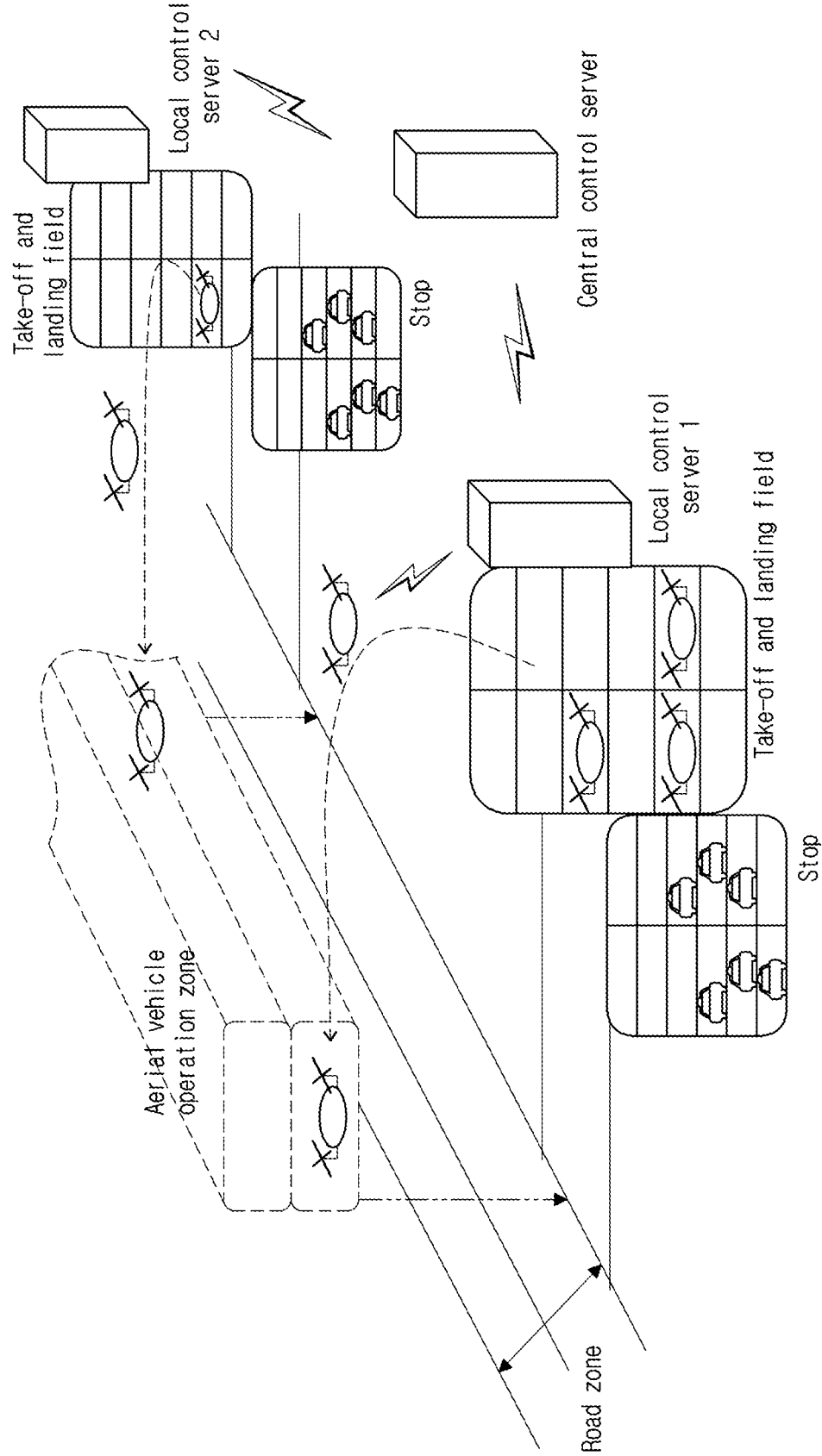
FIG. 3A is a conceptual view showing schematically a configuration of an air vehicle control system according to an embodiment of the present disclosure.
Figure 3B:
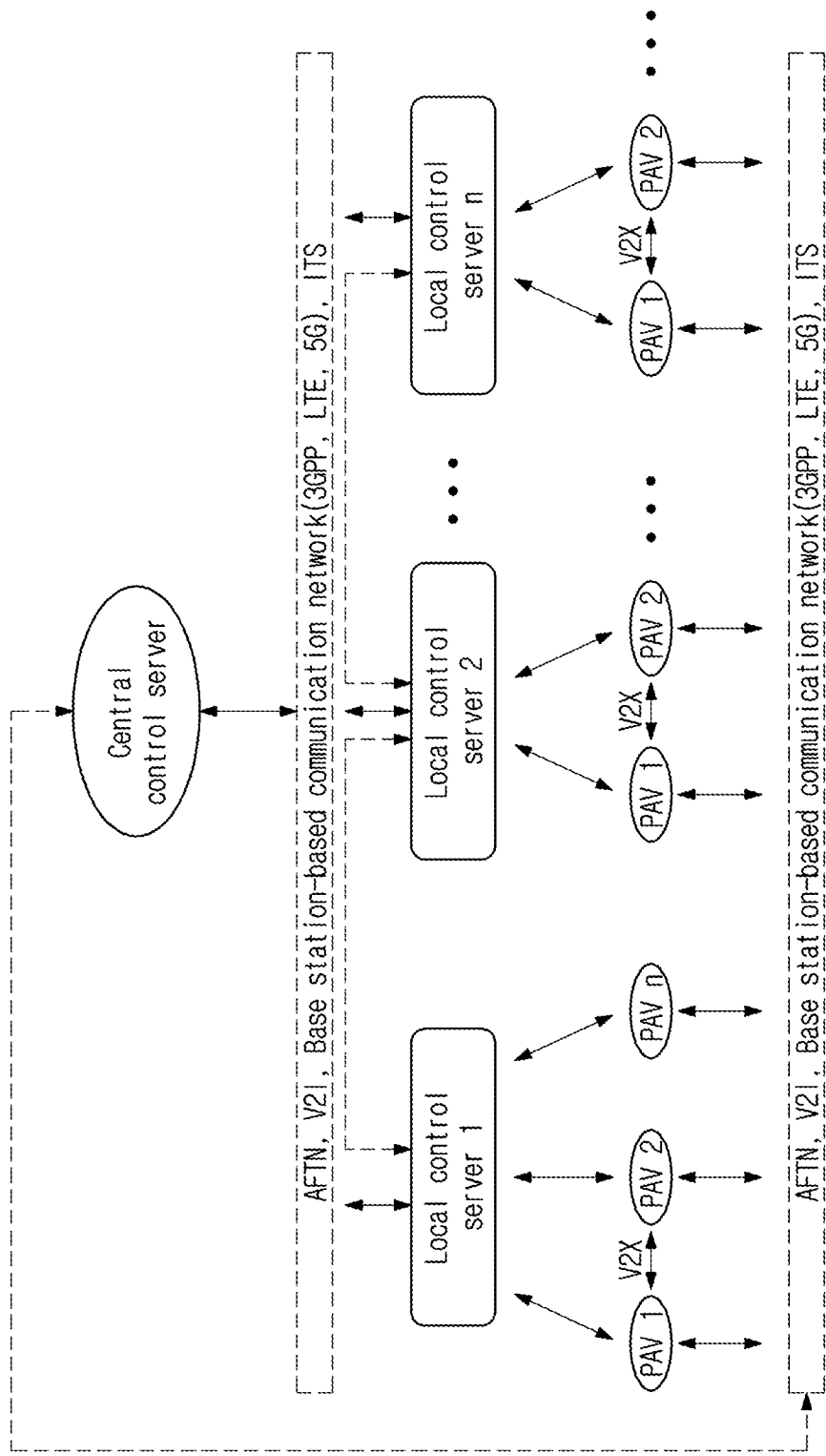
FIG. 3B is a view illustrating a structure of an air vehicle control system according to an embodiment of the present disclosure.

FIG. 3A is a conceptual view showing schematically a configuration of an aerial vehicle control system according to an embodiment of the present disclosure, and FIG. 3B is a view illustrating a structure of an aerial vehicle control system according to an embodiment of the present disclosure.

Referring to FIG. 3A, a take-off and landing facility and an aerial vehicle operation zone may be set, and an aerial vehicle control system may control the movement or operation of a personal aerial vehicle in the take-off and landing facility and the aerial vehicle operation zone.

A take-off and landing facility may include a stop, in which a personal aerial vehicle or a moving object may stop, and a take-off and landing field in which a personal aerial vehicle may take off and land. Herein, the stop and the take-off and landing field may be set as different areas on a single plane. As another example, a take-off and landing facility may include a building constructed with a multiplicity of floors, and a stop and a take-off and landing field may be set on different floors. As yet another example, a stop may be configured to separate areas in which a personal aerial vehicle or a moving object may stop. For example, a stop may include a first stop, where a personal aerial vehicle stands, and a second stop where a moving object stops. A first stop and a second stop may set as different areas on a single plane or as different floors. As yet another example, a first stop and a take-off and landing field may be set as different areas on a single plane, and a second stop may be set as a different floor from the first stop and the take-off and landing field.

For example, a personal aerial vehicle may be available in a road zone, a stop, a take-off and landing field and an aerial vehicle operation zone and may include a moving object with a shape capable of vertical take-off and landing (e.g., vertical take-off and landing (VTOL) and electric vertical take-off and landing (e-VTOL)). Accordingly, a personal aerial vehicle may move from a road zone to a stop, a take-off and landing field and the like and move from the take-off and landing field to an aerial vehicle operation zone under the control of a control server (local control server or central control server). In addition, under the control of a control server (local control server or central control server), a personal aerial vehicle may move from an aerial vehicle operation zone to a take-off and landing field.

Furthermore, in an embodiment of the present disclosure, a section, in which a personal aerial vehicle is moved from a take-off and landing field to an aerial vehicle operation zone, is called an entry section, and a section, in which the personal aerial vehicle is moved from the aerial vehicle operation zone to the take-off and landing field, is called an exit section.

Meanwhile, a central control server may be connected with a local control server via a communication network and receive information on a personal aerial vehicle from the local control server. In addition, the central control server may provide the local control server with information necessary to control a personal aerial vehicle or to control an entry section or an exit section. In addition, the central control server may provide operation information necessary for a personal aerial vehicle to operate in an aerial vehicle operation zone. Meanwhile, although a personal aerial vehicle may freely move in a take-off and landing field, an entry section, an exit section and an aerial vehicle operation zone, as personal aerial vehicles move at relatively high speed, an accident is very likely to happen in the take-off and landing field, the entry section and the exit section. Accordingly, it is necessary to set control right for movement or operation by distinguishing a local control server, a central control server, a personal aerial vehicle and the like according to a location or situation of the personal aerial vehicle.

Referring to FIG. 3B, an aerial vehicle control system according to an embodiment of the present disclosure may include a local control server, a central control server, and a personal aerial vehicle, and the local control server, the central control server and the personal aerial vehicle may exchange information necessary for control via communication. Also, a personal aerial vehicle may control movement or operation based on information received from a local control server and a central control server.

A personal aerial vehicle and a local control server may be connected with each other based on a vehicle to everything (V2X) communication scheme, and the personal aerial vehicle and a central control server may be connected with each other based on a vehicle to everything (V2X) communication scheme. As an example, it is desirable that a personal aerial vehicle and a local control server are connected to each other through a vehicle to infrastructure (V2I) scheme and the personal aerial vehicle and a central control server are connected to each other through a V2I scheme. A personal aerial vehicle and a local control server may be connected with each other via aeronautical telecommunication network (AFTN), and the personal aerial vehicle and a central control server may be connected with each other via AFTN. As yet another example, a personal aerial vehicle and a local control server may be connected with each other via a base station-based communication network, and the personal aerial vehicle and a central control server may be connected with each other via a base station-based communication network. As an example, a base station-based communication network may include a cellular communication network, a communication network based on 3rd generation partnership project (3GPP), a communication network based on long term evolution (LTE) and a communication network based on fifth generation (5G) technology standard. Although, in an embodiment of the present disclosure, a communication network based on 3rd generation partnership project (3GPP), a communication network based on long term evolution (LTE) and a communication network based on fifth generation (5G) technology standard are described as examples of base station-based communications, but the present disclosure is not limited thereto, and various types of cellular communication networks may be used.

Furthermore, an aerial vehicle control system according to an embodiment of the present disclosure may configure different communication networks connecting a local control server or a central control server according to a location of a personal aerial vehicle. As an example, in case a personal aerial vehicle exists within a take-off and landing facility or exists in an entry section or an exit section, the personal aerial vehicle may be connected with a local control server based on an X2V scheme. In addition, in case the personal aerial vehicle exists in an aerial vehicle operation zone, the personal aerial vehicle may be connected with the central control server (or local control server) via AFTN or cellular communication network.

In addition, a personal aerial vehicle may be connected with another personal aerial vehicle through a V2X scheme. Thus, a personal aerial vehicle may be connected with another neighboring personal aerial vehicle through a V2X scheme, and a distance between neighboring personal aerial vehicles may be measured so that a collision between personal aerial vehicles may be prevented.

Basically, a central control server may set an operation condition in an aerial vehicle control system such as an entry section, an exit section, an aerial vehicle operation zone and the like and set and provide a control parameter matching the operation condition to a local control server or a personal aerial vehicle. Herein, the operation condition may include a speed, an interval, a set altitude of an aerial vehicle operation zone and the like.

Furthermore, a central control server may check and store a weather condition necessary to set an operation condition. To this end, the central control server may be connected with a device (or server) capable of providing weather information via a communication network and receive and store weather information periodically. As another example, the central control server may receive and store weather information from a device (or server) capable of providing weather information whenever a preset condition (e.g., lighting, gale, storm, heavy rainfall) is satisfied.

Also, a central control server may manage operation information of a personal aerial vehicle operated within an aerial vehicle control system and identify and manage a degree of congestion of each section of an aerial vehicle operation zone based on the operation information.

Also, a central control server may identify and manage event information (e.g., accident, obstacle, emergency situation) occurring within an aerial vehicle operation zone.

Also, a central control server may perform network linkage between local control servers, management of situations in a take-off and landing facility connected to a local control server, and the like.

Meanwhile, a local control server may manage control right of a personal aerial vehicle in an entry section, an exit section and an aerial vehicle operation zone. As an example, a local control server may set control right of a personal aerial vehicle to a local control server or to a personal aerial vehicle. To this end, a local control server may receive information required to set control right of a personal aerial vehicle from the personal aerial vehicle and set and manage the control right for the personal aerial vehicle based on the received information.

Also, a local control server may identify and manage a condition of a stop, a condition of a take-off and landing field and the like. For example, the condition of a stop may include an occupancy state of a spot included in the stop, an identifier of a moving object or a personal aerial vehicle present at the occupied spot and the like. Likewise, the condition of a take-off and landing field may include an occupancy state of a spot included in the take-off and landing field, an identifier of a personal aerial vehicle present at the occupied spot and the like. Furthermore, a local control server may identify and manage a degree of congestion in a take-off and landing facility based on a condition of a stop, a condition of a take-off and landing field and the like.

Furthermore, a local control server may check and store the above-described weather condition. As an example, a local control server may receive and store weather information from a central control server. As another example, a local control server may be connected with a device (or server) capable of providing weather information via a communication network and receive and store weather information periodically. Also, a local control server may store and manage operation conditions like an entry section, an exit section and an aerial vehicle operation zone. An operation condition may be received from a central control server and be managed.

Also, a local control server may identify and manage event information (e.g., accident, obstacle, emergency situation) occurring within an aerial vehicle operation zone. Event information may be received from a central control server or be generated based on a degree of congestion of a take-off and landing facility, weather information and the like.

Meanwhile, like a conventional personal aerial vehicle, a personal aerial vehicle may be controlled to move in a predetermined airspace, and the movement may be controlled through a user's operation control or autonomous driving control. Particularly, the movement or operation of a personal aerial vehicle may be controlled in a take-off and landing field, an entry section, an exit section, and an aerial vehicle operation zone, and the movement or operation may be controlled based on information received from a local control server or a central control server. Furthermore, control right of a personal aerial vehicle may be determined according to a zone that is set in an aerial vehicle control system, and movement or operation may be controlled in response to the determined control right.

Figure 4A:
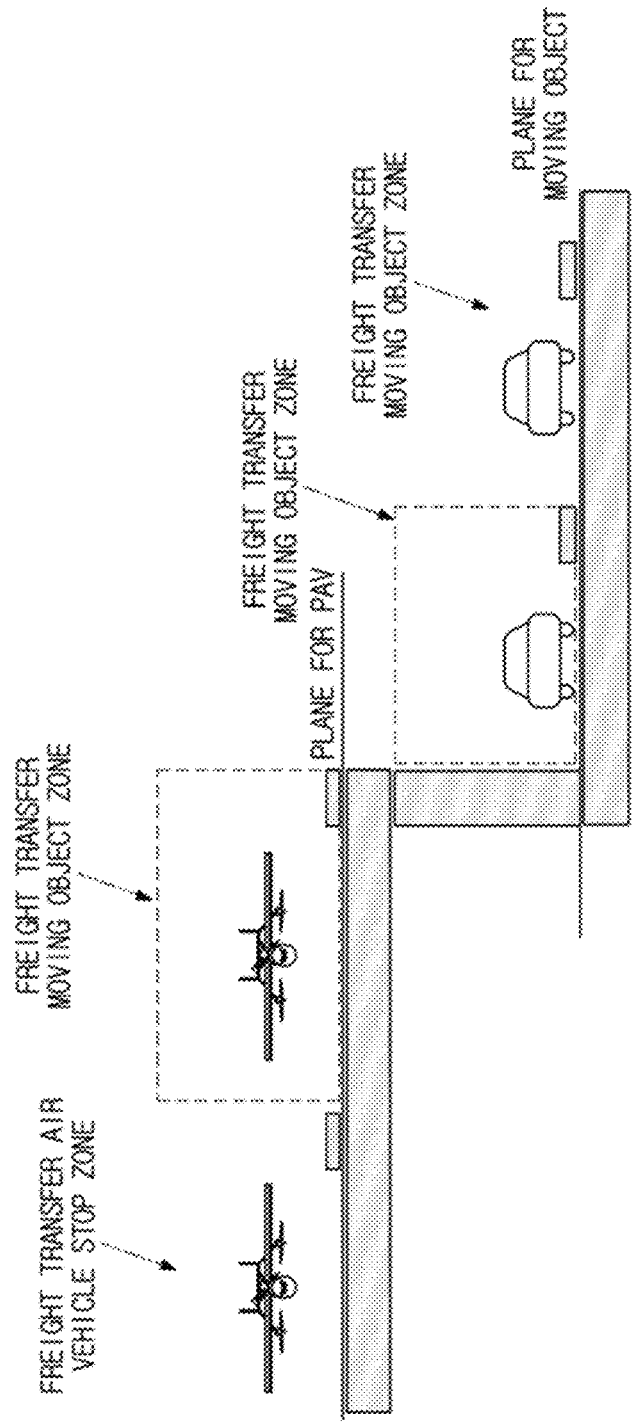
Figure 4B:
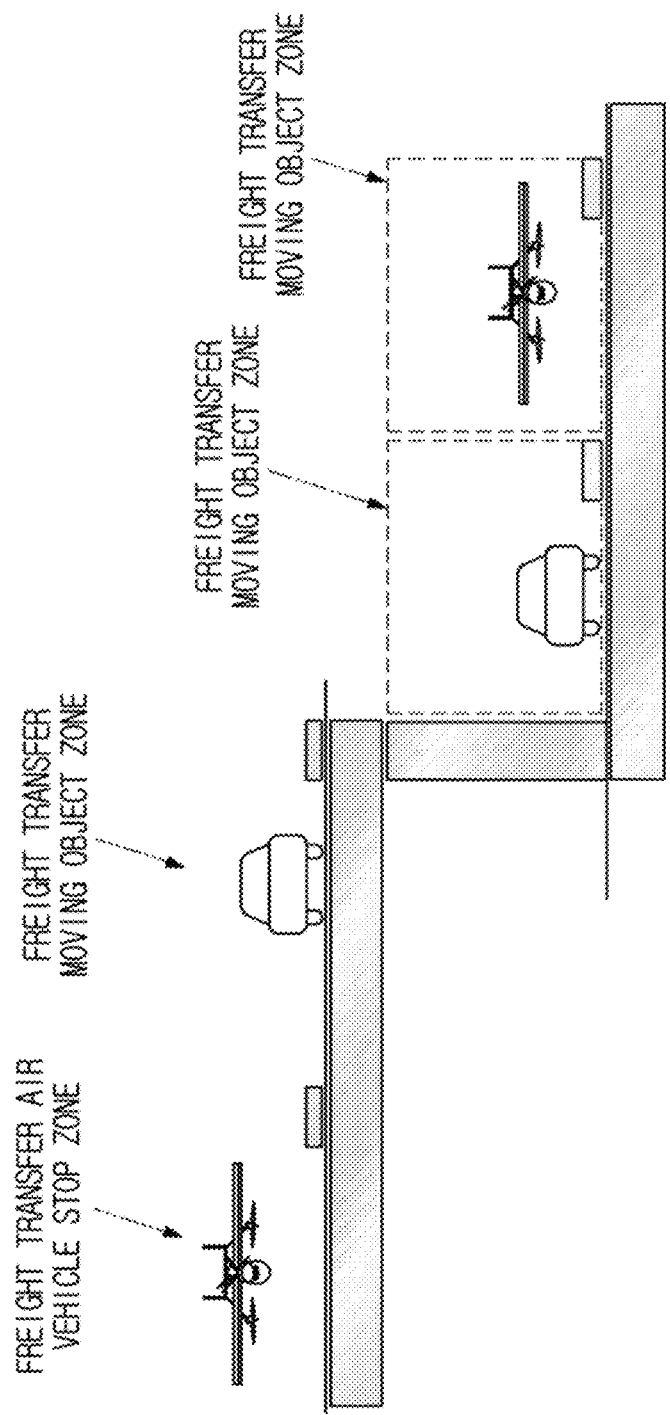

FIGS. 4A to 4C illustrate a structure of a take-off and landing facility in a multimodal transportation system according to an embodiment of the present disclosure.

First, as described above, a take-off and landing facility in a multimodal transportation system according to an embodiment of the present disclosure may include a stop and a take-off and landing pad, and the stop in particular may include a zone, in which a freight transfer air vehicle may stop (hereinafter, referred to as 'freight transfer air vehicle stop zone'), and a zone in which a freight transfer moving object may stop (hereinafter, referred to as 'freight transfer moving object zone'). Also, the stop may further include a freight standby zone in which freight may be temporarily loaded and stored. As an example, a freight transfer air vehicle stop zone and a freight transfer moving object stop zone may be provided on a same plane. As another example, a take-off and landing facility may consist of a plurality of floors, and a freight transfer air vehicle stop zone, a freight transfer moving object stop zone, or a freight standby zone may be provided on different floors.

Furthermore, a stop may include a zone, in which a general air vehicle may stop (hereinafter, referred to as 'general air vehicle stop zone'), and a zone in which a general moving object may stop (hereinafter, referred to as 'general moving object stop zone').

A general air vehicle stop zone and a general moving object stop zone may be in an area different from an area for a freight transfer air vehicle stop zone and a freight transfer moving object stop zone. As an example, a general air vehicle stop zone and a freight transfer air vehicle stop zone may be on a same plane, and a general moving object stop zone and a freight transfer moving object stop zone may be on different planes. For example, a general air vehicle stop zone and a freight transfer air vehicle stop zone may be in an area with open overhead space (e.g. rooftop of a building or open space on the ground), and a general moving object stop zone and a freight transfer moving object stop zone may be in a space under the general air vehicle stop zone and the freight transfer air vehicle stop zone (e.g., in a building or in an underground space). Another example, a freight transfer air vehicle stop zone and a freight transfer moving object stop zone may be in an area with open overhead space (e.g. rooftop of a building or open space on the ground), and a general air vehicle stop zone and a general moving object stop zone may be in a space under the freight transfer air vehicle stop zone and the freight transfer moving object stop zone (e.g. in a building or in an underground space).

Although, in an embodiment of the present disclosure, a freight transfer air vehicle stop zone, a freight transfer moving object stop zone, a general air vehicle stop zone, a general moving object stop zone and a freight standby zone are exemplified with respect to their structures, but the present disclosure is not limited thereto, and the structures may be modified and applied in various ways by those skilled in the art.

Meanwhile, a take-off and landing facility may include an apparatus that is capable of transferring freight among a freight transfer air vehicle stop zone, a freight transfer moving object stop zone, or a freight standby zone. Herein, the apparatus capable of transferring freight may include a conveyor belt, a cargo-carrying robot and the like. Furthermore, an apparatus capable of transferring freight may be connected with a local transportation management server (or central transportation management server) via a communication network and transfer freight, based on information provided from the local transportation management server (or central transportation management server), between freight transfer air vehicles, between freight transfer moving objects, or between a freight transfer air vehicle and a freight transfer moving object. As an example, as a freight transfer air vehicle stops in a freight transfer air vehicle zone, the freight transfer air vehicle may request movement of freight, which is loaded in the air vehicle, to a local transportation management server, and the local transportation management server may check, through a central transportation management server, information on the freight (hereinafter, referred to as 'freight information'), for which the movement is requested, and a zone to which the freight may be moved. Accordingly, the apparatus capable of transferring freight may transfer freight to a corresponding zone. Herein, the corresponding zone may include a zone, in which a freight transfer air vehicle stops, a zone, in which a freight transfer moving object stops, and the like. As another example, the corresponding zone may include a freight standby zone.

Figure 5:
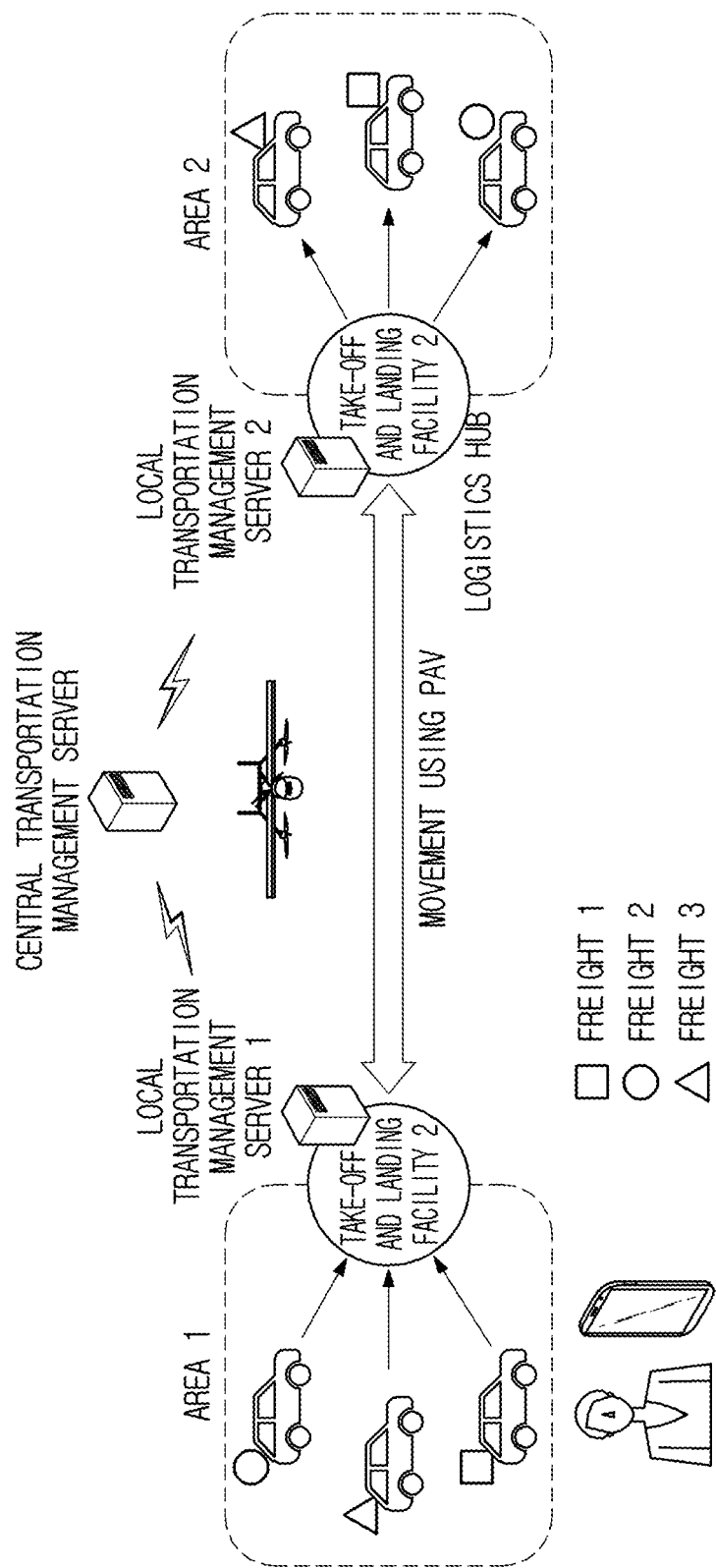
FIG. 5 is a conceptual view illustrating an operation of processing transfer of freight in a multimodal transportation system according to an embodiment of the present disclosure.

FIG. 5 is a conceptual view illustrating an operation of processing transfer of freight in a multimodal transportation system according to an embodiment of the present disclosure.

Referring to FIG. 5, a multimodal transportation system may process overall transportation of freight through a local transportation management server, which is connected with a take-off and landing facility, and a central transportation management server. The central transportation management server may manage information on freight (freight information), which is to be transferred in the multimodal transportation system, and provide the freight information to a user through a user device, a moving object or an air vehicle. Accordingly, the user may select freight to be transferred through a user device, a moving object or an air vehicle. As an example, a situation is illustrated in which freight is transferred from a departure point of a first area to a destination of a second area. The central transportation management server may provide freight information to a user device (e.g. moving object, portable terminal), and a user may select freight to be moved, using the user device (e.g. moving object, portable terminal). Herein, the central transportation management server may provide information on destination and waypoint of freight, and the user may confirm the destination or the waypoint and select freight that matches a destination or waypoint to which the user wants to move. As another example, the central transportation management server may be configured to compare the destination and waypoint of freight and the destination and waypoint of a user and to provide a list of coincident freight.

Next, the user may load freight on a moving object and move to a first take-off and landing facility.

A first local transportation management server, which corresponds to the first take-off and landing facility, may identify entry of the moving object loaded with freight and execute an operation for moving the freight to an air vehicle. As an example, the first local transportation management server may allocate and provide a zone (freight transfer moving object stop zone), to which the moving object loaded with freight is moved, and execute the operation for moving the freight to an air vehicle. Thus, the freight may be loaded in the air vehicle and be moved from the first take-off and landing facility to a second take-off and landing facility. Herein, the central transportation management server may manage and provide information on the air vehicle loaded with freight, location information of the air vehicle, an arrival time of the air vehicle at the second take-off and landing facility and the like. Also, the central transportation management server may execute an operation of a moving object for freight from the second take-off and landing facility to a destination of the second area. As described above, information on an air vehicle loaded with freight, location information of the air vehicle and an arrival time of the air vehicle at the second take-off and landing facility and information on a destination of freight may be provided to a user device (e.g. moving object, portable terminal), and a user may select freight to be moved, using the user device (e.g. moving object, portable terminal). In addition, as the air vehicle loaded with freight arrives at the second take-off and landing facility, the second local transportation management server may provide the central transportation management server with information that the freight has arrived at the take-off and landing facility, and the central transportation management server may provide the information to the user who selects the movement of the freight. Accordingly, the user may load the freight in the take-off and landing facility and move to a destination.

Figure 6:
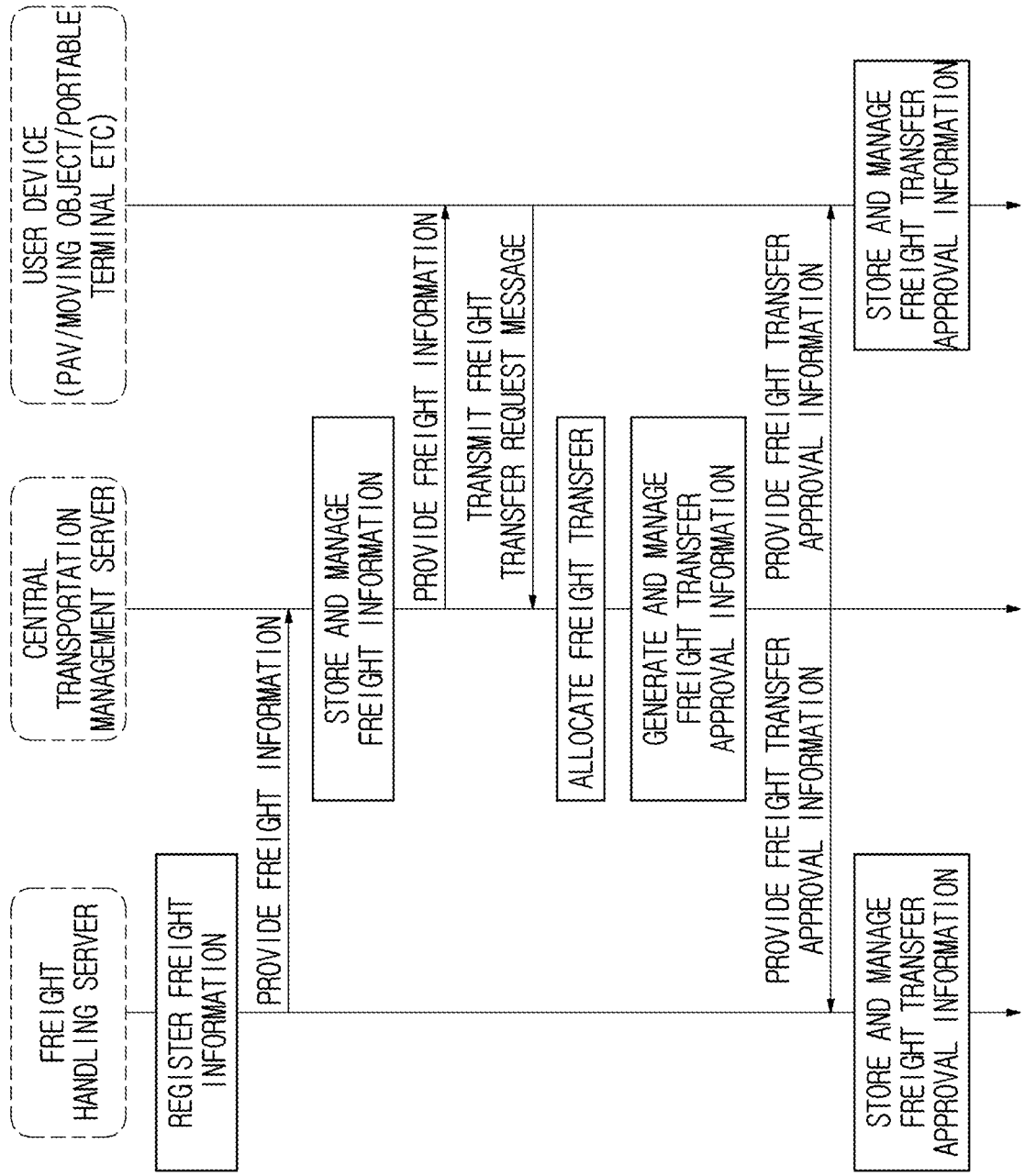
FIG. 6 is a view illustrating an operation of allocating freight in a multimodal transportation system according to an embodiment of the present disclosure.

FIG. 6 is a view illustrating an operation of allocating freight in a multimodal transportation system according to an embodiment of the present disclosure.

Referring to FIG. 6, a central transportation management server provided in a multimodal transportation system may be connected with a freight handling server. The freight handling server may register and manage information (freight information) that is basically necessary to transport freight from a departure point to a destination. Herein, the freight information may include an identifier of freight, a departure point, a destination, information on a sender, information on a receiver, a type of freight, a size of freight and the like. Although, in an embodiment of the present disclosure, a freight handling server is exemplified to register and manage freight information, but the present disclosure is not limited thereto and various modifications are possible by considering an operation of the conventional server apparatus for handling freight.

A freight handling server may provide freight information, which is registered and managed, to a central transportation management server. The central transportation management server may store and manage freight information. In particular, the central transportation management server may provide an environment in which freight may be transferred through a freight transfer PAV and a freight transfer moving object, which are operated in a multimodal transportation system.

As an example, the central transportation management server may provide freight information to a user device (e.g. air vehicle, moving object, portable terminal). In addition, the user device may display the received freight information and provide an environment capable of selecting predetermined freight that may be transferred through an air vehicle or a moving object. Also, the user device may be configured to transmit a message (hereinafter, referred to as 'freight transfer request message') requesting transfer of freight, which is selected by a user, to the central transportation management server. For example, the freight transfer request message may include an identifier of selected freight, an identifier of an entity (air vehicle, moving object, etc.), which will transfer, a type of an entity (air vehicle, moving object, etc.), which will transfer, information on a transfer departure point, information on a transfer destination, a transfer departure time, a transfer arrival time and the like. Herein, the information on a transfer departure point and the information on a transfer destination may include information that indicates a take-off and landing facility used as a logistics hub. As another example, since the information on a transfer departure point and the information on a transfer destination may be designated not as a take-off and landing facility but as an initial delivery point of freight, a final destination of freight and the like, the information on a transfer departure point and the information on a transfer destination may include address information of the departure point and address information of the destination.

The central transportation management server may allocate transfer of freight, which is selected by a user, by using information contained in a freight transfer request message. For example, the central transportation management server may identify freight selected by the user and determine an entity (air vehicle, moving object, etc.), which will transfer the freight, and a departure point and a destination of the freight transfer.

In addition, based on information thus determined, the central transportation management server may configure freight transfer approval information. As an example, the transfer approval information may include an identifier of freight, an identifier of an entity (air vehicle, moving object, etc.), which will transfer, a type of an entity (air vehicle, moving object, etc.), which will transfer, information on a transfer departure point, information on a transfer destination, a transfer departure time, a transfer arrival time, and a result of freight transfer approval.

The central transportation management server may provide the freight transfer approval information to a user device (e.g. air vehicle, moving object, portable terminal). In response to this, the user device (e.g. air vehicle, moving object, portable terminal) may store and manage the freight transfer approval information and be allocated a freight transfer air vehicle stop zone by using the freight transfer approval information while entering a take-off and landing facility.

Also, the central transportation management server may provide the freight transfer approval information to a freight handling server, and the freight handling server may store and manage the freight transfer approval information.

Although a central transportation management server has been described to provide freight transfer approval information to a user device, the present disclosure is not limited thereto, and various modifications are applicable as long as freight transfer approval information may be managed. As an example, the central transportation management server may configure a freight transfer response message, which includes an identifier of a freight transfer request message and a result of freight transfer approval, and provide the freight transfer response message to a user device (e.g. air vehicle, moving object, portable terminal). In response to this, the user device may confirm, based on an identifier of the freight transfer request message, an identifier of freight, an identifier of an entity (air vehicle, moving object, etc.), which will transfer, a type of an entity (air vehicle, moving object, etc.), which will transfer, information on a transfer departure point, information on a transfer destination, a transfer departure time and a transfer arrival time and configure and store freight transfer approval information.

Figure 7A:
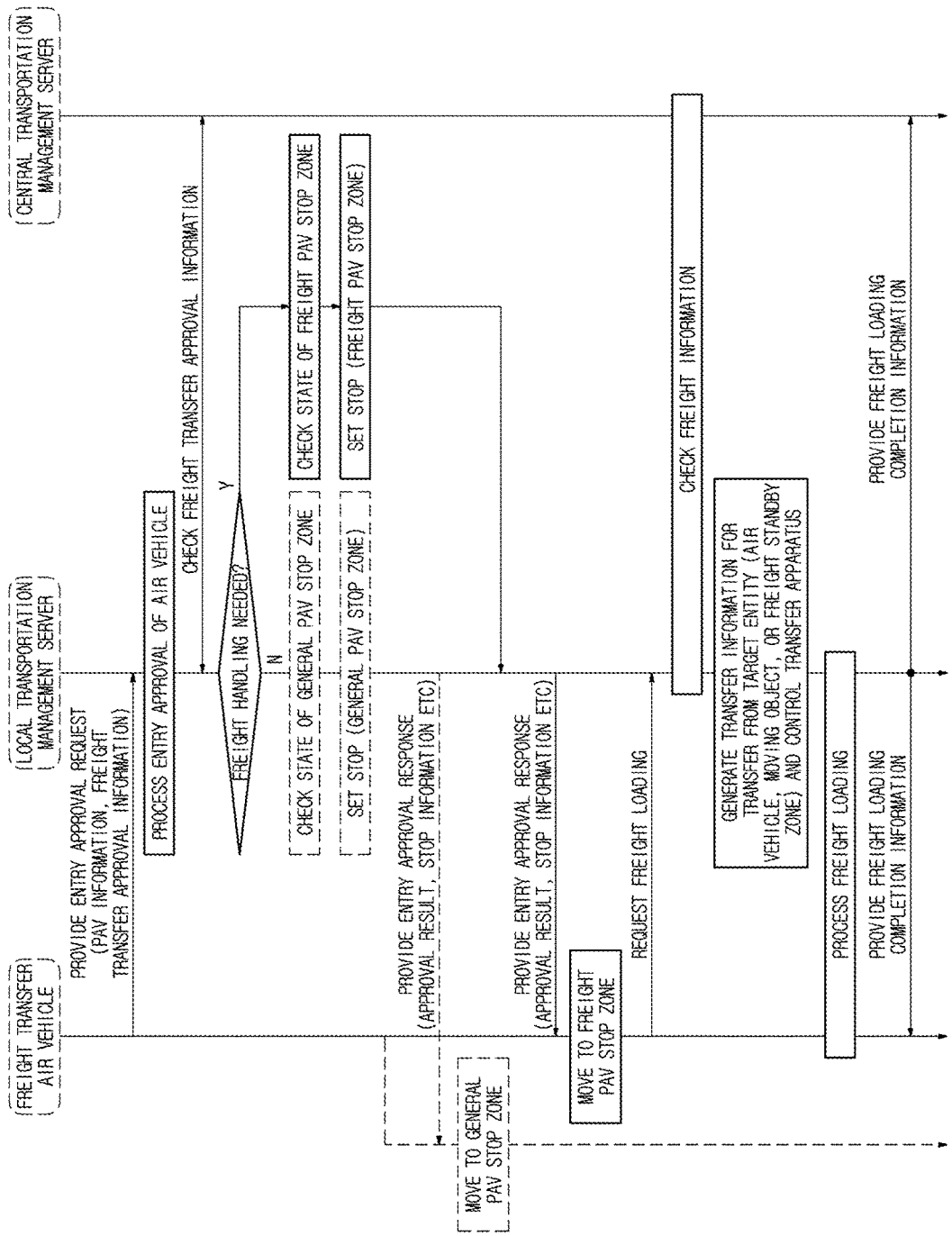
FIGS. 7A and 7B illustrate an operation of processing freight transfer in a multimodal transportation system according to an embodiment of the present disclosure.
Figure 7B:
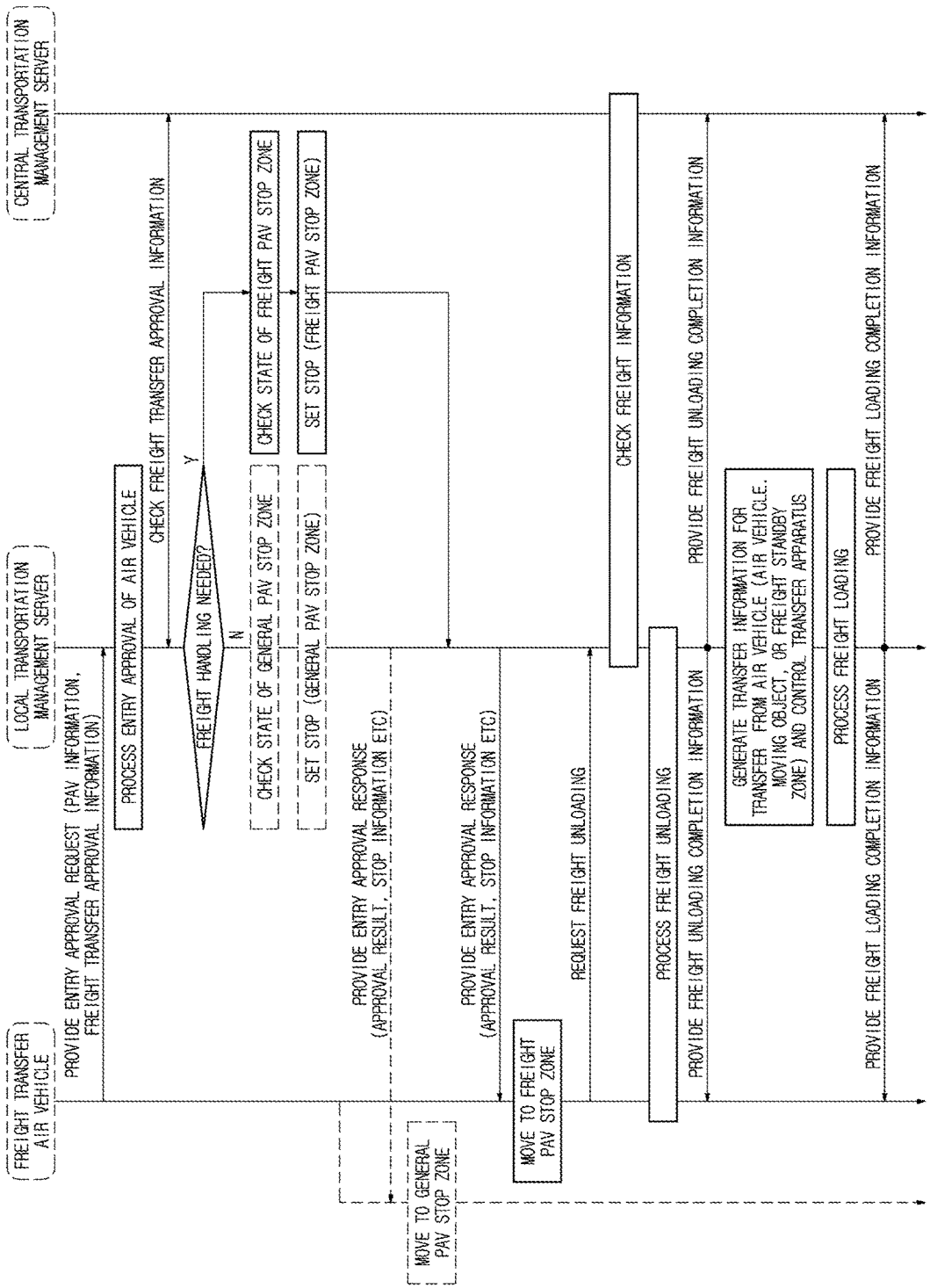

FIGS. 7A to 7B are a view illustrating an operation of processing freight transfer in a multimodal transportation system according to an embodiment of the present disclosure.

FIG. 7A and FIG. 7B illustrate an operation of processing freight transfer of a freight transfer air vehicle in a multimodal transportation system. Particularly, FIG. 7A illustrates an operation of loading freight in a freight transfer air vehicle, and FIG. 7B illustrates an operation of unloading freight from a freight transfer air vehicle.

Referring to FIG. 7A, first, as a freight transfer air vehicle approaches a take-off and landing facility, the freight transfer air vehicle may transmit an entry approval request to a local transportation management server in order to enter the take-off and landing facility. Herein, the entry approval request may include freight transfer approval information together with information on the air vehicle (identifier of the air vehicle, type of the air vehicle, user of the air vehicle and the like). The local transportation management server may process approval for the entry of the air vehicle based on the information on the air vehicle. Especially, the local transportation management server may transmit the freight transfer approval information to a central transportation management server and request confirmation of the freight transfer approval information.

In case the freight transfer approval information is confirmed to be valid information, the local transportation management server may check whether or not an air vehicle needs to handle freight in the take-off and landing facility. In case the air vehicle needs to handle freight in the take-off and landing facility, the local transportation management server may check a condition of a freight PAV stop zone. For example, the local transportation management server may check whether or not there is an available stop area in an area that is allocated as the freight PAV stop zone, and may determine one of the available stop areas and set it as a stop of the air vehicle.

Furthermore, the freight transfer approval information may further include information that indicates whether the air vehicle is an air vehicle that will load freight or an air vehicle that is already loaded with freight. As FIG. 7A exemplifies an operation of loading freight in a freight transfer air vehicle, the freight transfer approval information described above includes information indicating that the air vehicle will load freight.

Next, the local freight management server may transmit an entry approval response to the air vehicle. Herein, the entry approval response may include a result of entry approval, information on stop and the like. In response to this, the air vehicle may move to and stop at the freight PAV stop zone based on the information on stop.

Next, the air vehicle may transmit a freight loading request to the local transportation management server, and the local transportation management server may check freight information for freight that is to be loaded to the air vehicle. As an example, the local transportation management server may request and receive freight information from the central transportation management server. As another example, while checking the freight transfer approval information, the local transportation management server may receive and store temporarily freight information and identify the freight information for freight to be loaded to the air vehicle by checking the temporarily stored freight information.

The freight to be loaded to the air vehicle may be loaded in another vehicle or in a moving object or be provided in a freight standby zone. Accordingly, the local transportation management server may identify a zone, in which freight is present, generate transfer information for transferring the freight from the zone, in which the freight is present, to the air vehicle, which will be loaded with the freight, and control a transfer apparatus that is provided in the take-off and landing facility based on the transfer information. As an example, the freight information may include an identifier of the freight, information on the zone in which the freight is present (e.g. identifier of a stop), information on a zone in which the air vehicle to be loaded with the freight is present (e.g. identifier of a stop) and the like.

Next, by controlling the transfer apparatus, the local transportation management server may transfer the freight to the zone, in which the air vehicle is present, and load the freight into the air vehicle. Herein, the local transportation management server may communicate with the air vehicle in order to load the freight into the air vehicle. In addition, the local transportation management server may control the freight loading of the air vehicle by controlling the opening and closing of a freight loader of the air vehicle.

When the air vehicle finishes being loaded with the freight, the local transportation management server may provide freight loading completion information to the central transportation management server. As an example, the freight loading completion information may include freight information, freight loading time information and the like.

In addition, the local transportation management server may provide the freight loading completion information to the air vehicle.

Meanwhile, when freight handling is not needed, the local transportation management server may check the condition of a general PAV stop zone. For example, the local transportation management server may check whether or not there is an available stop area in an area that is allocated as the general PAV stop zone, and may determine one of the available stop areas and set it as a stop of the air vehicle.

Next, the local freight management server may transmit an entry approval response to the air vehicle. Herein, the entry approval response may include a result of entry approval, information on stop and the like. In response to this, the air vehicle may move to and stop at the general PAV stop zone based on the information on stop.

Referring to FIG. 7B, as a freight transfer air vehicle approaches a take-off and landing facility, the freight transfer air vehicle may transmit an entry approval request to a local transportation management server in order to enter the take-off and landing facility. Herein, the entry approval request may include freight transfer approval information together with information on the air vehicle (identifier of the air vehicle, type of the air vehicle, user of the air vehicle and the like). The local transportation management server may process approval for the entry of the air vehicle based on the information on the air vehicle. Especially, the local transportation management server may transmit the freight transfer approval information to a central transportation management server and request confirmation of the freight transfer approval information.

Furthermore, the freight transfer approval information may further include information that indicates whether the air vehicle is an air vehicle that will load freight or an air vehicle that is already loaded with freight. As FIG. 7B exemplifies an operation of unloading freight from a freight transfer air vehicle, the freight transfer approval information described above includes information indicating that the air vehicle is already loaded with freight.

In case the freight transfer approval information is confirmed to be valid information, the local transportation management server may check whether or not an air vehicle needs to handle freight in the take-off and landing facility. In case the air vehicle needs to handle freight in the take-off and landing facility, the local transportation management server may check a condition of a freight PAV stop zone. For example, the local transportation management server may check whether or not there is an available stop area in an area that is allocated as the freight PAV stop zone, and may determine one of the available stop areas and set it as a stop of the air vehicle.

Next, the local freight management server may transmit an entry approval response to the air vehicle. Herein, the entry approval response may include a result of entry approval, information on stop and the like. In response to this, the air vehicle may move to and stop at the freight PAV stop zone based on the information on stop.

Next, the air vehicle may transmit a freight unloading request to the local transportation management server, and the local transportation management server may check freight information for freight that is to be unloaded from the air vehicle. As an example, the local transportation management server may request and receive freight information from the central transportation management server. As another example, while checking the freight transfer approval information, the local transportation management server may receive and store temporarily freight information and identify the freight information for freight to be unloaded from the air vehicle by checking the temporarily stored freight information.

Herein, the local transportation management server may communicate with the air vehicle in order to unload the freight from the air vehicle. In addition, the local transportation management server may process and control the freight unloading of the air vehicle by controlling the opening and closing of a freight loader of the air vehicle.

When the freight is completed unloaded from the air vehicle, the local transportation management server may provide freight unloading completion information to the central transportation management server. As an example, the freight unloading completion information may include freight information, freight unloading time information and the like.

The freight, which has been unloaded from the air vehicle, may be freight to be loaded into another air vehicle again, to be loaded into a moving object or to be transferred to a freight standby zone. Accordingly, the local transportation management server may identify a zone, to which freight will be moved, generate transfer information for transferring the freight from the air vehicle to the zone, to which the freight will be moved, and control a transfer apparatus that is provided in the take-off and landing facility based on the transfer information. As an example, the transfer information may include an identifier of the freight, information on the zone in which the freight is to stop (e.g. identifier of a stop), information on a zone in which the air vehicle to be loaded with the freight is present (e.g. identifier of a stop) and information on a freight standby zone to which the freight is to be moved.

Next, by controlling the transfer apparatus, the local transportation management server may transfer the freight to the zone, in which a target entity (e.g., air vehicle, moving object) is present, and load the freight into the target entity (e.g., air vehicle, moving object). Herein, the local transportation management server may communicate with the target entity (e.g., air vehicle, moving object) in order to load the freight into the target entity (e.g., air vehicle, moving object). In addition, the local transportation management server may control the freight loading of the air vehicle by controlling the opening and closing of a freight loader of the target entity (e.g., air vehicle, moving object).

When the air vehicle finishes being loaded with the freight, the local transportation management server may provide freight loading completion information to the central transportation management server. As an example, the freight loading completion information may include freight information, freight loading time information and the like.

In addition, the local transportation management server may provide the freight loading completion information to the air vehicle.

Meanwhile, when freight handling is not needed, the local transportation management server may check the condition of a general PAV stop zone. For example, the local transportation management server may check whether or not there is an available stop area in an area that is allocated as the general PAV stop zone, and may determine one of the available stop areas and set it as a stop of the air vehicle.

Next, the local freight management server may transmit an entry approval response to the air vehicle. Herein, the entry approval response may include a result of entry approval, information on stop and the like. In response to this, the air vehicle may move to and stop at the general PAV stop zone based on the information on stop.

Figure 8A:
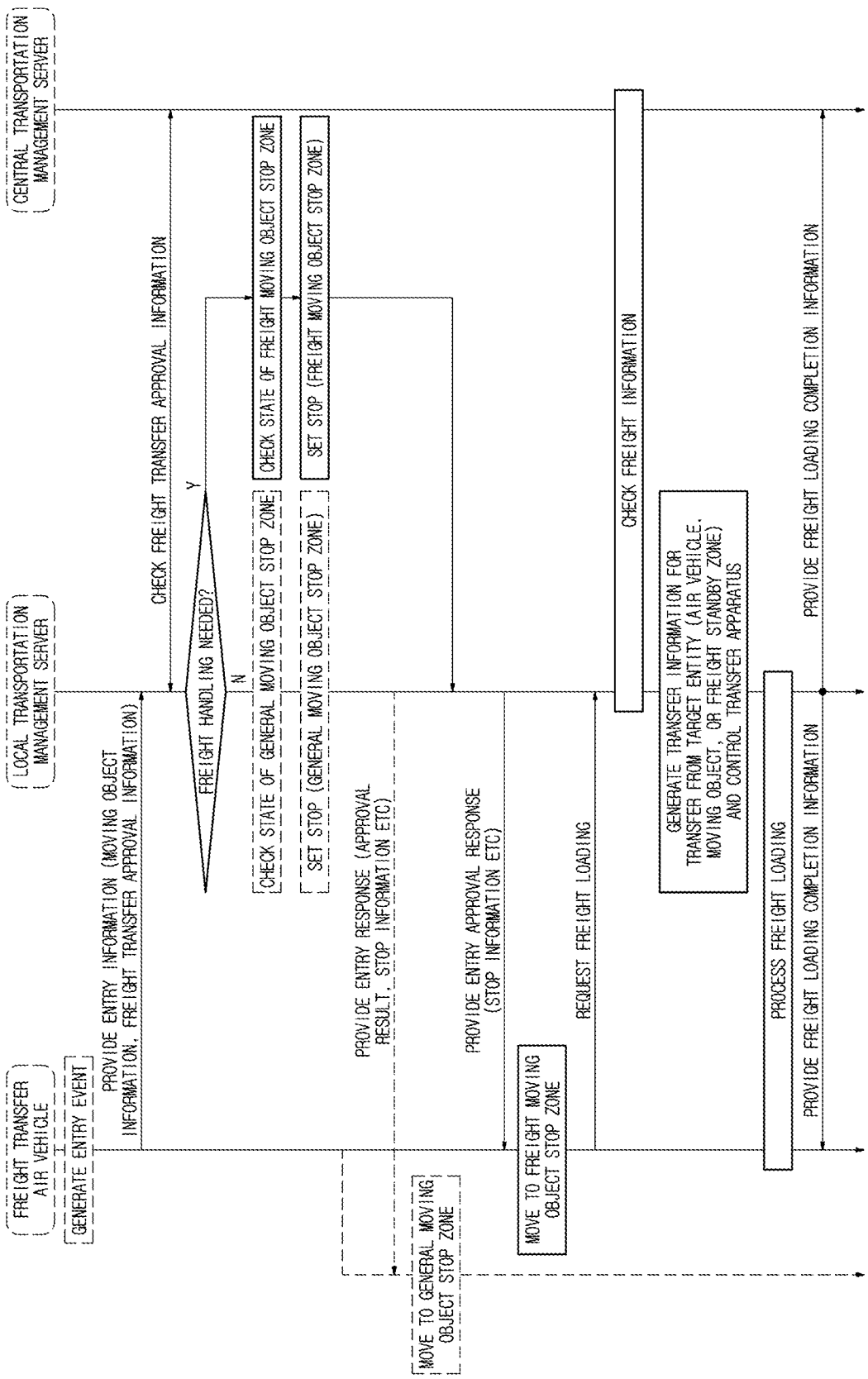
FIGS. 8A and 8B illustrate another operation of processing freight transfer in a multimodal transportation system according to an embodiment of the present disclosure.
Figure 8B:
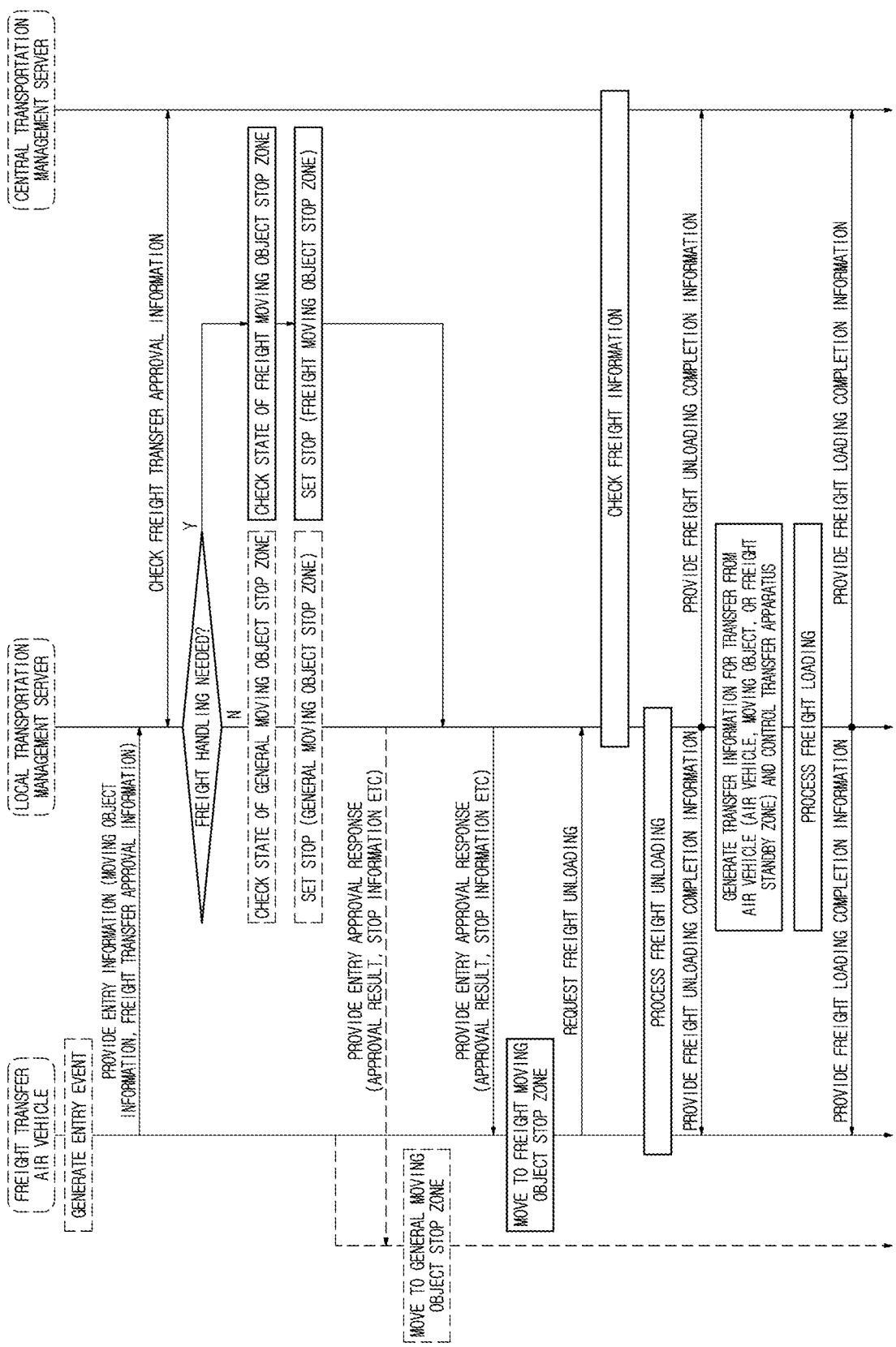

FIGS. 8A to 8B illustrate an operation of processing freight transfer in a multimodal transportation system according to an embodiment of the present disclosure.

FIG. 8A and FIG. 8B illustrate an operation of processing freight transfer of a freight transfer moving object in a multimodal transportation system. Particularly, FIG. 8A illustrates an operation of loading freight in a freight transfer moving object, and FIG. 8B illustrates an operation of unloading freight from a freight transfer moving object.

First, referring to FIG. 8A, like air vehicles, a freight transfer moving object may provide entry information to a local transportation management server, when entering or approaching a take-off and landing facility. As an example, the entry information may be provided based on an entry event. By means of an apparatus which is provided in the take-off and landing facility in order to detect entry or exit of a moving object, the moving object may confirm entry into the take-off and landing facility and generate an entry event in response thereto. As another example, when the moving object approaches a predetermined distance (e.g., 1 km) from the take-off and landing facility, the moving object may generate an entry event.

Herein, the entry information may include freight transfer approval information together with information on the moving object (identifier of the moving object, type of the moving object, user of the moving object and the like). A local transportation management server may transmit the freight transfer approval information to a central transportation management server and request confirmation of the freight transfer approval information.

In case the freight transfer approval information is confirmed to be valid information, the local transportation management server may check whether or not the moving object needs to handle freight in the take-off and landing facility. In case the moving object needs to handle freight in the take-off and landing facility, the local transportation management server may check a condition of a freight moving object stop zone. For example, the local transportation management server may check whether or not there is an available stop area in an area that is allocated as the freight moving object stop zone, and may determine one of the available stop areas and set it as a stop of the moving object.

Furthermore, the freight transfer approval information may further include information that indicates whether the moving object is a moving object that will load freight or a moving object that is already loaded with freight. As FIG. 8A exemplifies an operation of loading freight in a freight transfer moving object, the freight transfer approval information described above includes information indicating that the moving object will load freight.

Next, the local freight management server may transmit an entry response to the moving object. Herein, the entry response may include information on the stop and the like. In response to this, the moving object may move to and stop at the freight moving object stop zone based on the information on stop.

Next, the moving object may transmit a freight loading request to the local transportation management server, and the local transportation management server may check freight information for freight that is to be loaded to the moving object. As an example, the local transportation management server may request and receive freight information from the central transportation management server. As another example, while checking the freight transfer approval information, the local transportation management server may receive and store temporarily freight information and identify the freight information for freight to be loaded to the moving object by checking the temporarily stored freight information.

The freight to be loaded to the moving object may be loaded in an air vehicle or in another moving object or be provided in a freight standby zone. Accordingly, the local transportation management server may identify a zone, in which freight is present, generate transfer information for transferring the freight from the zone, in which the freight is present, to the moving object, which will be loaded with the freight, and control a transfer apparatus that is provided in the take-off and landing facility based on the transfer information. As an example, the freight information may include an identifier of the freight, information on the zone in which the freight is present (e.g. identifier of a stop), information on a zone in which the moving object to be loaded with the freight is present (e.g. identifier of a stop) and the like.

Next, by controlling the transfer apparatus, the local transportation management server may transfer the freight to the zone, in which the moving object is present, and load the freight into the moving object. Herein, the local transportation management server may communicate with the moving object in order to load the freight into the moving object. In addition, the local transportation management server may control the freight loading of the moving object by controlling the opening and closing of a freight loader of the moving object.

When the moving object finishes being loaded with the freight, the local transportation management server may provide freight loading completion information to the central transportation management server. As an example, the freight loading completion information may include freight information, freight loading time information and the like.

In addition, the local transportation management server may provide the freight loading completion information to the moving object.

Meanwhile, when freight handling is not needed, the local transportation management server may check the condition of a general moving object stop zone. For example, the local transportation management server may check whether or not there is an available stop area in an area that is allocated as the general moving object stop zone, and may determine one of the available stop areas and set it as a stop of the moving object.

Next, the local freight management server may transmit an entry response to the moving object. Herein, the entry response may include information on the stop and the like. In response to this, the moving object may move to and stop at the general moving object stop zone based on the information on the stop.

Referring to FIG. 8B, a freight transfer moving object may provide entry information to a local transportation management server, when entering or approaching a take-off and landing facility. As an example, the entry information may be provided based on an entry event. By means of an apparatus which is provided in the take-off and landing facility in order to detect entry or exit of a moving object, the moving object may confirm entry into the take-off and landing facility and generate an entry event in response thereto. As another example, when the moving object approaches a predetermined distance (e.g., 1 km) from the take-off and landing facility, the moving object may generate an entry event.

Herein, the entry information may include freight transfer approval information together with information on the moving object (identifier of the moving object, type of the moving object, user of the moving object and the like). A local transportation management server may transmit the freight transfer approval information to a central transportation management server and request confirmation of the freight transfer approval information.

Furthermore, the freight transfer approval information may further include information that indicates whether the moving object is a moving object that will load freight or a moving object that is already loaded with freight. As FIG. 8B exemplifies an operation of unloading freight from a freight transfer moving object, the freight transfer approval information described above includes information indicating that the moving object is already loaded with the freight.

In case the freight transfer approval information is confirmed to be valid information, the local transportation management server may check whether or not the moving object needs to handle freight in the take-off and landing facility. In case the moving object needs to handle freight in the take-off and landing facility, the local transportation management server may check a condition of a freight moving object stop zone. For example, the local transportation management server may check whether or not there is an available stop area in an area that is allocated as the freight moving object stop zone, and may determine one of the available stop areas and set it as a stop of the moving object.

Next, the local freight management server may transmit an entry response to the moving object. Herein, the entry response may include information on the stop and the like. In response to this, the moving object may move to and stop at the freight moving object stop zone based on the information on stop.

Next, the moving object may transmit a freight unloading request to the local transportation management server, and the local transportation management server may check freight information for freight that is to be unloaded from the moving object. As an example, the local transportation management server may request and receive freight information from the central transportation management server. As another example, while checking the freight transfer approval information, the local transportation management server may receive and store temporarily freight information and identify the freight information for freight to be unloaded from the moving object by checking the temporarily stored freight information.

The local transportation management server may communicate with the moving object in order to unload the freight from the moving object. In addition, the local transportation management server may process and control the freight unloading of the moving object by controlling the opening and closing of a freight loader of the moving object.

When the freight is completed unloaded from the moving object, the local transportation management server may provide freight unloading completion information to the central transportation management server. As an example, the freight unloading completion information may include freight information, freight unloading time information and the like.

The freight, which has been unloaded from the moving object, may be freight to be loaded into another moving object again, to be loaded into an air vehicle or to be transferred to a freight standby zone. Accordingly, the local transportation management server may identify a zone, to which freight will be moved, generate transfer information for transferring the freight from the moving object to the zone, to which the freight will be moved, and control a transfer apparatus that is provided in the take-off and landing facility based on the transfer information. As an example, the transfer information may include an identifier of the freight, information on the zone in which the freight is to stop (e.g. identifier of a stop), information on a zone in which the air vehicle to be loaded with the freight is present (e.g. identifier of a stop) and information on a freight standby zone to which the freight is to be moved.

Next, by controlling the transfer apparatus, the local transportation management server may transfer the freight to the zone, in which a target entity (e.g., air vehicle, moving object) is present, and load the freight into the target entity (e.g., air vehicle, moving object). Herein, the local transportation management server may communicate with the target entity (e.g., air vehicle, moving object) in order to load the freight into the target entity (e.g., air vehicle, moving object). In addition, the local transportation management server may control freight loading by controlling the opening and closing of a freight loader of the target entity (e.g., air vehicle, moving object).

When the moving object finishes being loaded with the freight, the local transportation management server may provide freight loading completion information to the central transportation management server. As an example, the freight loading completion information may include freight information, freight loading time information and the like.

In addition, the local transportation management server may provide the freight loading completion information to the moving object.

Meanwhile, when freight handling is not needed, the local transportation management server may check the condition of a general moving object stop zone. For example, the local transportation management server may check whether or not there is an available stop area in an area that is allocated as the general moving object stop zone, and may determine one of the available stop areas and set it as a stop of the moving object.

Next, the local freight management server may transmit an entry response to the moving object. Herein, the entry response may include information on the stop and the like. In response to this, the moving object may move to and stop at the general moving object stop zone based on the information on the stop.

Figure 9:
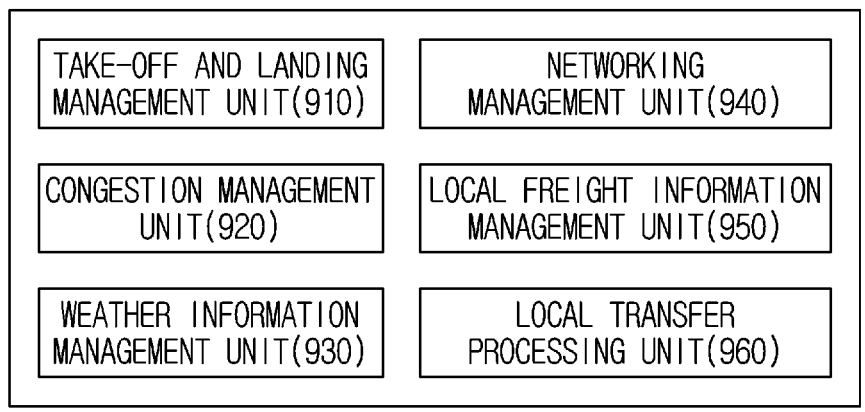
FIG. 9 is a block diagram illustrating a configuration of a local transportation management server for an air vehicle control system according to an embodiment of the present disclosure.

FIG. 9 is a block diagram illustrating a configuration of a local transportation management server for an air vehicle control system according to an embodiment of the present disclosure.

Referring to FIG. 9, a local transportation management server may include a take-off and landing management unit 910, a congestion management unit 920, a weather information management unit 930, a networking management unit 940, a local freight information management unit 950, and a logistics transfer management unit 960.

The take-off and landing management unit 910 may execute operations for managing an occupancy state of a take-off and landing facility, a state of an emergency take-off and landing pad, information on an air vehicle for which take-off is approved, information on an air vehicle which enters a landing pad, reservation information of take-off and landing, and the like.

For example, in the management of an occupancy state of a take-off and landing facility, identification numbers of stops and take-off and landing pads, which are included in the take-off and landing facility, may be managed, and information on a moving object or an air vehicle, which stops in a stop or a take-off and landing pad, may be managed. Furthermore, an air vehicle control system may operate and manage an emergency take-off and landing pad, and the take-off and landing management unit 910 may manage information on an air vehicle that stops, takes off or lands at the emergency take-off and landing pad.

In addition, the take-off and landing management unit 910 may store and manage information on an air vehicle, for which a take-off or landing approval is requested, and user information. For example, the take-off and landing management unit 910 may store temporarily information on an air vehicle, for which a take-off approval is requested, and user information and, when the air vehicle enters an air vehicle operation zone, may deliver the information on the air vehicle and the user information to a central transportation management server and then delete the temporarily stored information. In addition, the take-off and landing management unit 910 may store information on an air vehicle, for which a landing approval is requested, and user information and, when the air vehicle enters a take-off and landing pad or a stop, may store and manage the information on the air vehicle and the user information. Furthermore, when the air vehicle, which was present in the take-off and landing pad or the stop, goes out of the take-off and landing pad or the stop through a road zone, the take-off and landing management unit 910 may delete the information on the air vehicle and the user information.

In addition, the take-off and landing management unit 910 may receive reservation information of an air vehicle from a central transportation management server and may store and manage the received reservation information of the air vehicle. The reservation information of the air vehicle, which is provided by the central transportation management server, may include information on the air vehicle that is managed by a corresponding local transportation management server.

The congestion management unit 920 may check and manage a degree of congestion for a corresponding take-off and landing facility based on occupancy information of the take-off and landing facility and reservation information of an air vehicle. In addition, the congestion management unit 920 may receive destination information of an air vehicle, which is being operated in an air vehicle control system, from the central transportation management server, predict a degree of congestion for a take-off and landing facility by reflecting an arrival time of the air vehicle at the take-off and landing facility of destination, and manage a degree of congestion for the take-off and landing facility by using predicted information.

The weather information management unit 930 may receive and store central weather information provided by the central transportation management server. In addition, the weather information management unit 930 may store and manage local weather information that is identified through a weather observation device installed at a corresponding take-off and landing facility. In addition, the weather information management unit 930 may provide local weather information to a central control server.

The networking management unit 940 may manage the connection and maintenance with the central transportation management server and the connection and maintenance with a neighboring local transportation management server. In addition, the networking management unit 940 may manage connection with a moving object or an air vehicle.

In particular, the local freight information management unit 950 may perform overall freight handling in a local transportation management server. Specifically, the local freight information management unit 950 may confirm freight transfer approval information, which is provided from a freight transfer air vehicle (or freight transfer moving object), and determine the validity of the freight transfer approval information via communication with a central transportation management server. In addition, the local freight information management unit 950 may determine, based on occupancy information of a stop zone, a stop to be allocated to a freight transfer air vehicle (or freight transfer moving object). Also, the local freight information management unit 950 may manage information regarding in which area of a take-off and landing facility each piece of freight is located.

Also, the local freight information management unit 950 may execute an operation of checking freight information via communication with the central transportation management server and, when freight loading or unloading of a freight transfer air vehicle (or freight transfer moving object) is completed, may provide corresponding information (e.g., freight loading completion information, freight unloading completion information) to the central transportation management server.

The logistics transfer management unit 960 may process an operation of transferring freight using a transfer apparatus provided in a take-off and landing facility. As an example, the logistics transfer management unit 960 may identify a zone, in which freight is present, through linkage with the local freight information management unit 950, and determine transfer information for transferring the freight from the zone, in which the freight is present, to an air vehicle (or moving object), which will be loaded with the freight or transfer information for transferring the freight from an air vehicle (or moving object), which is loaded with the freight, to a target entity (air vehicle or moving object) to which the freight is to be loaded. Also, the logistics transfer management unit 960 may process an operation of transferring freight by controlling a transfer apparatus provided in a take-off and landing facility based on transfer information.

Figure 10:
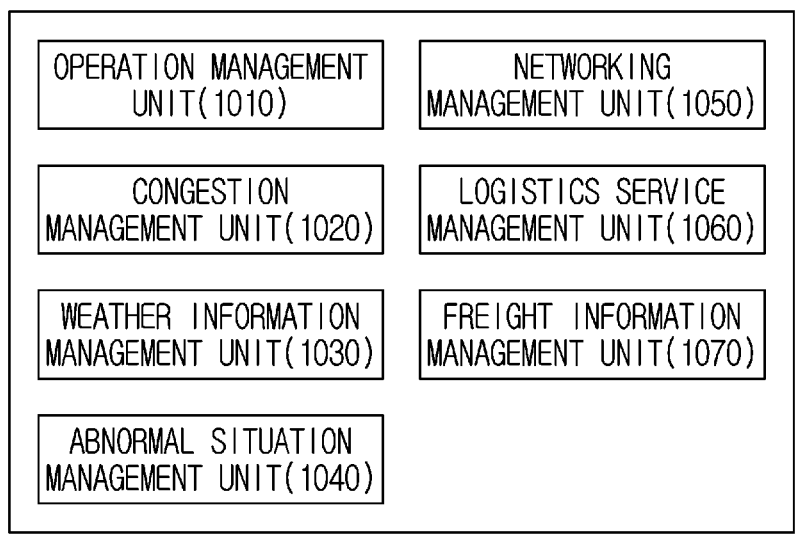
FIG. 10 is a block diagram illustrating a configuration of a central transportation management server for an air vehicle control system according to an embodiment of the present disclosure.

FIG. 10 is a block diagram illustrating a configuration of a central transportation management server for an air vehicle control system according to an embodiment of the present disclosure.

Referring to FIG. 10, a central transportation management server may include an operation management unit 1010, a congestion management unit 1020, a weather information management unit 1030, an abnormal situation management unit 1040, a networking management unit 1050, a logistics service management unit 1060, and a freight information management unit 1070.

The operation management unit 1010 may manage information related to an operation of an air vehicle that enters an aerial vehicle operation zone. For example, the operation management unit 1010 may store and manage the departure point information, destination information and real-time location information of the air vehicle.

The operation management unit 1010 may check and store charging information for an air vehicle that enters and exits an aerial vehicle operation zone.

The congestion management unit 1020 may check and manage congestion information of each section in an air vehicle operation zone based on the departure point information, destination information and real-time location information of an air vehicle.

The weather information management unit 1030 may check and store central weather information. In addition, the weather information management unit 1030 may store central weather information in a local control server. The weather information management unit 1030 may receive and store local weather information from a local control server.

The abnormal situation management unit 1040 may monitor whether or not an abnormal situation occurs in a specific location or section, based on congestion information of each section in an aerial vehicle operation zone and central weather information. When an abnormal situation occurs, the abnormal situation management unit 1040 may transmit an abnormal situation occurrence event to an air vehicle or a local control server.

The networking management unit 1050 may manage the connection and maintenance with a local control server and the connection and maintenance with a neighboring local control server. In addition, the networking management unit 1050 may manage connection with a moving object or an air vehicle and especially manage connection with and maintenance of an air vehicle in an air vehicle operation zone through a control channel.

The logistics service management unit 1060, which is a component unit for controlling an overall operation of logistics service managed in a multimodal transportation system, may set up a service for processing freight delivery between air vehicles, freight delivery between an air vehicle and a moving object, and freight delivery between moving objects, and may execute an operation for providing such a service. As an example, the logistics service management unit 1060 may receive freight transfer through an air vehicle, a moving object and the like and allocate the received freight to an air vehicle, a moving object and the like. Also, the logistics service management unit 1060 may manage information of users who using a logistics service.

The freight information management unit 1070 may store and manage freight information that is generated when a multimodal transportation system performs and manages a logistics service. As an example, the freight information management unit 1070 may store and manage the above-described freight transfer approval information, freight information, freight loading completion information, freight unloading completion information and the like.

Figure 11:
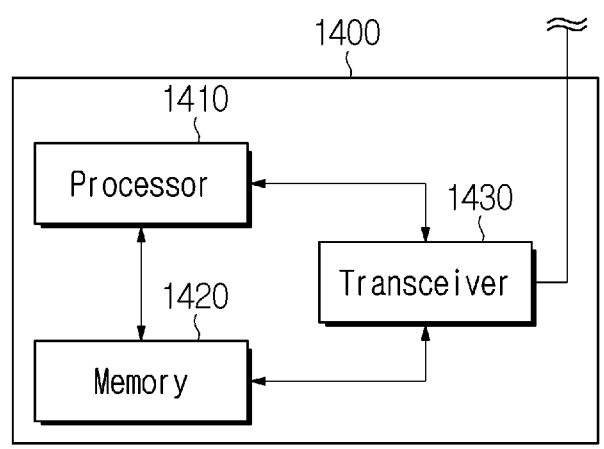
FIG. 11 is a view illustrating an apparatus configuration according to an embodiment of the present disclosure.

FIG. 11 is a view illustrating an apparatus configuration according to an embodiment of the present disclosure.

Referring to FIG. 11, the apparatus may include at least one of the above-described moving object, a device, a server and an RSU. In other words, the apparatus may be configured to communicate and work with another device. The present disclosure is not limited to the above-described embodiment. For example, for the above-described operation, an apparatus 1400 may include one or more among a processor 1410, a memory 1420, and a transceiver 1430. In other words, the apparatus may include a necessary configuration for communicating with another apparatus. In addition, the apparatus may include another configuration apart from the above-described configuration. In other words, the apparatus may have a configuration, which includes the above-described apparatus for communicating with another device but is not limited thereto, and may be operated based on what is described above.

Although the exemplary methods of the present disclosure described above are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various exemplary embodiments of the disclosure are not intended to be all-inclusive and are intended to illustrate representative aspects of the disclosure, and the features described in the various exemplary embodiments may be applied independently or in a combination of two or more. In addition, the various exemplary embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays. A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various exemplary embodiments to be performed on a device or computer, and a non-transitory computer-readable medium in which such software or instructions are stored and are executable on a device or computer.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A method for processing multimodal transportation based on an air vehicle in a multimodal transportation system including a central transportation management server and a local transportation management server, the method comprising:
- confirming, by the local a transportation management server, freight transfer approval information that is provided by a freight transfer object which approaches a take-off and landing facility, wherein the freight transfer approval information is generated by the central transportation management server and is provided to the freight transfer object;
- setting, by the local transportation management server, a freight stop zone in response to a need for freight handling of the freight transfer object, wherein the need for freight handling of the freight transfer object is derived from the freight transfer approval information; and
- processing, by the local transportation management server, freight loading or unloading of the freight transfer object, based on freight information corresponding to the freight transfer object;
- wherein the processing of the freight loading or unloading of the freight transfer object comprises controlling a transfer apparatus provided in the take-off and landing facility so that the freight is loaded on or unloaded from the freight transfer object.

2. The method of claim 1, further comprises presetting, by the central transportation management server, the freight transfer approval information.

3. The method of claim 2, wherein the presetting of the freight transfer approval information comprises:
- providing freight information on at least one piece of freight that is to be transferred;
- determining at least one piece of freight that is to be transferred by the freight transfer object; and
- generating the freight transfer approval information corresponding to the at least one piece of freight that is determined.

4. The method of claim 1, wherein the freight transfer approval information includes at least one of an identifier of a selected freight, an identifier of an object that will transfer freight, information on a departure point of transfer, information on a destination of transfer, a departure time of transfer, and an arrival time of transfer.

5. The method of claim 1, wherein the confirming of the freight transfer approval information comprises receiving a message, which includes the freight transfer approval information, from the freight transfer object.

6. The method of claim 5, wherein the message including the freight transfer approval information comprises a message which is transmitted from the air vehicle and requests entry into the take-off and landing facility.

7. The method of claim 5, wherein the message including the freight transfer approval information comprises a message which is transmitted from a moving object and notifies entry into the take-off and landing facility.

8. The method of claim 1, wherein the freight transfer object comprises at least one of a freight transfer air vehicle and a freight transfer moving object.

9. The method of claim 8, wherein the freight stop zone comprises at least one of a freight air vehicle stop zone, in which the freight transfer air vehicle stops, and a freight moving object stop zone, in which the freight transfer moving object stops.

10. The method of claim 1, wherein the processing of the freight loading or unloading of the freight transfer object comprises controlling loading on or unloading from the freight transfer object through communication between the freight transfer object and the local transportation management server.

11. The method of claim 1, further comprises setting a general stop zone, as freight handling of the freight transfer object is not needed.

12. The method of claim 1, wherein the freight stop zone comprises at least one of a freight transfer air vehicle stop zone and a freight transfer moving object stop zone, wherein a general stop zone comprises at least one of a general air vehicle stop zone and a general moving object stop zone.

13. The method of claim 12, wherein the freight transfer air vehicle stop zone and the freight transfer moving object stop zone are prepared on a same plane and be distinguished by different areas, or the freight transfer air vehicle stop zone and the freight transfer moving object stop zone are prepared on different planes.

14. The method of claim 12, wherein the general air vehicle stop zone and the general moving object stop zone are prepared on a same plane and be distinguished by different areas, or the general air vehicle stop zone and the general moving object stop zone are prepared on different planes.

15. The method of claim 11, wherein the freight stop zone is prepared on a different plane from the general stop zone.

16. A multimodal transportation facility apparatus for supporting freight transfer among a plurality of freight transfer objects, the apparatus comprising:
- a freight transfer air vehicle stop zone, in which at least one freight transfer air vehicle stops;
- a freight transfer moving object stop zone, in which at least one freight transfer moving object stops;
- a take-off and landing pad where the at least one freight transfer air vehicle takes off and lands;
- a freight transfer apparatus for processing freight transfer between the at least one freight transfer moving object and the at least one freight transfer air vehicle; and a local transportation management server for controlling at least one operation among the freight transfer moving object, the freight transfer air vehicle and the freight transfer apparatus; wherein the local transportation management server is configured to:
- confirm freight transfer approval information that is provided by the freight transfer air vehicle which approaches the take-off and landing pad, wherein the freight transfer approval information is generated by a central transportation management server and is provided to the freight transfer air vehicle;
- set the freight transfer moving object stop zone in response to a demand need for freight handling of the freight transfer air vehicle, wherein the demand need for freight handling of the freight transfer object is derived from the freight transfer approval information; and
- process freight loading or unloading of freight transfer air vehicle based on freight information corresponding to the freight transfer air vehicle, wherein the processing of the freight loading or unloading of the freight transfer object comprises controlling a transfer apparatus provided in the take-off and landing facility so that the freight is loaded on or unloaded from the freight transfer object.

* * * * *